US012761638B2

(12) United States Patent
Przybylski et al.

(10) Patent No.: US 12,761,638 B2
(45) Date of Patent: *Oct. 13, 2026

(54) CONTROL SYSTEM WITH AUTOMATIC CONTROL PROBLEM FORMULATION USING BIDIRECTIONAL CONNECTIONS AND PORTS

(71) Applicant: Tyco Fire & Security GmbH, Neuhausen am Rheinfall (CH)

(72) Inventors: Andrew J. Przybylski, Franksville, WI (US); John H. Burroughs, Wauwatosa, WI (US); Ryan A. Baumgartner, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 354 days.

This patent is subject to a terminal disclaimer.

(21) Appl. No.: 18/587,611

(22) Filed: Feb. 26, 2024

(65) Prior Publication Data

US 2024/0201676 A1 Jun. 20, 2024

Related U.S. Application Data

(63) Continuation-in-part of application No. 17/074,014, filed on Oct. 19, 2020, now Pat. No. 11,914,353, (Continued)

(51) Int. Cl.
*G05B 19/00* (2006.01)
*G05B 19/418* (2006.01)

(52) U.S. Cl.
CPC .................. *G05B 19/41885* (2013.01); *G05B 2219/35215* (2013.01); *G05B 2219/35261* (2013.01)

(58) Field of Classification Search
None
See application file for complete search history.

(56) References Cited

U.S. PATENT DOCUMENTS 8,903,554 B2 12/2014 Stagner
9,429,923 B2 8/2016 Ward et al.
(Continued)

FOREIGN PATENT DOCUMENTS

EP 1 156 286 A2 11/2001
WO WO-2012/161804 A1 11/2012
WO WO-2013/130956 A1 9/2013

OTHER PUBLICATIONS

"AVEVA Process Simulation," Product Datasheet, URL: https://www.aveva.com/content/dam/aveva/documents/datasheets/Datasheet_ProcessSimulation_EN.pdf.coredownload.inline.pdf,2020, 5 pages.
(Continued)

*Primary Examiner* — Paul B Yanchus, III
(74) *Attorney, Agent, or Firm* — Foley & Lardner LLP

(57) ABSTRACT

A control system operates equipment to consume, produce, or store one or more resources. The control system obtains modeling input describing a physical layout of the equipment. The modeling input may indicate a bidirectional connection between the equipment or a bidirectional port of the equipment. The control system determines one or more cycles formed by the equipment based on the modeling input. A cycle may include a path of directed connections between the equipment that forms a closed loop. The control system formulates a control problem using the one or more cycles formed by the equipment and operates the equipment according to the control problem.

20 Claims, 19 Drawing Sheets

Related U.S. Application Data which is a continuation of application No. 16/118, 962, filed on Aug. 31, 2018, now Pat. No. 10,809,705.

(60) Provisional application No. 62/553,218, filed on Sep. 1, 2017.

(56) References Cited

U.S. PATENT DOCUMENTS

| | | | | |
|---|---|---|---|---|
| 10,809,705 | B2 | 10/2020 | Przybylski | |
| 11,914,353 | B2 * | 2/2024 | Przybylski | G06Q 50/06 |
| 2003/0055798 | A1 | 3/2003 | Hittle et al. | |
| 2005/0192680 | A1 | 9/2005 | Cascia et al. | |
| 2007/0142975 | A1 | 6/2007 | Piche | |
| 2015/0134120 | A1 | 5/2015 | Sun et al. | |
| 2015/0316907 | A1 | 11/2015 | Elbsat et al. | |
| 2016/0299999 | A1 | 10/2016 | James et al. | |
| 2017/0104345 | A1 | 4/2017 | Wenzel et al. | |
| 2018/0197253 | A1 | 7/2018 | Elbsat et al. | |

OTHER PUBLICATIONS

"CPECS: Optimized viable speed solution for new and existing chilled water plants," Kiltech, URL: https://www.vertisys.net/wp-content/uploads/2020/03/Kiltech-CPECS_Brochure.pdf, 2020, 4 pages.

Afram et al., "Theory and Application of HVAC Control Systems -A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Astrom, K., "Optimal Control of Markov Decision Processes with Incomplete State Estimation," Journal of Mathematical Analysis and Applications, Feb. 1965, vol. 10, No. 1 (pp. 174-205).

Bittanti, S. et al., Adaptive Control of Linear Time Invariant Systems: The "Bet on the Best" Principle, Communications in Information and Systems, 2006, vol. 6, No. 4 (pp. 299-320).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Chen et al., "Control-oriented System Identification: an H1 Approach," Wiley-Interscience, 2000, vol. 19, Chapters 3 & 8 (38 pages).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 4, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Feng, J. et al., "Model Predictive Control of Radiant Slab Systems with Evaporative Cooling Sources," Energy and Buildings, 2015, 87 (pp. 199-210).

George et al., "Time Series Analysis: Forecasting and Control", Fifth Edition, John Wiley & Sons, 2016, Chapters 4-7 and 13-15, 183 pages.

Hackner, J.R., "HVAC system dynamics and energy use in existing buildings," Doctoral Dissertation, University of Madison, Wisconsin, 1984 (174 pages).

Hardt, M. et al., "Gradient Descent Learns Linear Dynamical Systems", Journal of Machine Learning Research, 2018, 19 (pp. 1-44).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Helmicki, A. et al. "Control Oriented System Identification: a Worst-case/deterministic Approach in H1," IEEE Transactions on Automatic Control, 1991, 36.10 (pp. 1163-1176).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

Kelman et al., "Analysis of Local Optima in Predictive Control for Energy Efficient Buildings," Journal of Building Performance Simulation, Apr. 16, 2012, vol. 6, No. 3 (pp. 236-255).

Kelman, A. et al., "Bilinear Model Predictive Control of a HVAC System Using Sequential Quadratic Programming", Proceedings of the IFAC World Congress, Sep. 2, 2011 (6 pages).

Kingma, D. et al., "ADAM: A Method for Stochastic Optimization", International Conference on Learning Representations (ICLR), 2015, 15 pages.

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

Lazic, N. et al., "Data center cooling using model-predictive control", 32nd Conference on Neural Information Processing Systems, 2018, 10 pages.

Ljung (ed.), "System Identification: Theory for the User", 2nd Edition, Prentice Hall, Upper Saddle River, New Jersey, 1999, Chapters 5 and 7, 40 pages.

Ljung et al., "Theory and Practice of Recursive Identification," vol. 5. JSTOR, 1983, Chapters 2, 3 & 7, 80 pages.

Ma, Y. et al., "Model Predictive Control for the Operation of Building Cooling Systems", IEEE Transactions on Control Systems Technology, May 2012, 20:3, pp. 796-803.

Ma, Y. et al., "Predictive Control for Energy Efficient Buildings with Thermal Storage: Modeling, Stimulation, and Experiments", IEEE Control Systems, Feb. 2012, 32.1 (pp. 44-64).

Mckenna et al., "A Trnsys model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

(56) References Cited

OTHER PUBLICATIONS

Sturzenegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

CONTROL SYSTEM WITH AUTOMATIC CONTROL PROBLEM FORMULATION USING BIDIRECTIONAL CONNECTIONS AND PORTS

CROSS-REFERENCE TO RELATED PATENT APPLICATIONS

This application is a continuation-in-part of U.S. patent application Ser. No. 17/074,014 filed Oct. 19, 2020, which is a continuation of U.S. patent application Ser. No. 16/118,962 filed Aug. 31, 2018 (now U.S. Pat. No. 10,809,705), which claims the benefit of and priority to U.S. Provisional Patent Application No. 62/553,218 filed Sep. 1, 2017, all of which are incorporated by reference herein in their entireties.

BACKGROUND

The present disclosure relates generally to a central plant or central energy facility configured to serve the energy loads of a building or campus. The present disclosure relates more particularly to the use of an economic model predictive control (EMPC) strategy to optimize the operation of a plant.

A central plant typically includes multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants include energy storage. Energy storage may be a tank of water that stores hot water for campus heating, an ice tank for campus cooling, and/or battery storage. In the presence of real-time pricing from utilities, it may be advantageous to manipulate the time that a certain resource or energy type is consumed. Instead of producing the resource exactly when it is required by the load, it can be optimal to produce that resource at a time when the production cost is low, store it, and then use it when the resource needed to produce that type of energy is more expensive.

It can be difficult and challenging to optimally allocate the energy loads across the assets of the central plant. An EMPC strategy can be an effective way to optimize the operation of all of these assets. Existing techniques for formulating a mathematical model to solve an EMPC problem remain manual and time-consuming. The present disclosure details a method that can automatically formulate the EMPC problem when given the physical layout of a central plant and associated assets.

SUMMARY

One implementation of the present disclosure is method for operating equipment in a central plant. The method includes receiving an input model that describes a physical layout of the equipment in the central plant. The method further includes creating a net list that defines connections between the equipment in the central plant using the input model and iterating through the net list to find one or more systems of interconnected equipment. The method further includes discovering one or more cycles present within each of the one or more systems and generating groups of the equipment based on the one or more cycles present within each of the one or more systems. The method further includes formulating an optimization problem using the systems and the groups of the equipment and operating the equipment in the central plant according to the optimization problem.

In some embodiments, the central plant purchases or otherwise obtains resources including electricity, water, or natural gas.

In some embodiments, the equipment in the central plant includes subplants configured to consume an input resource and produce an output resource, the subplants including a heater subplant, a chiller subplant, a heat recovery chiller subplant, a steam subplant, or an electricity subplant and one or more types of resource storage including hot thermal energy storage, cold thermal energy storage, or electrical energy storage.

In some embodiments, the central plant is configured to serve a hot water load, a cold water load, or an electric load associated with a building.

In some embodiments, the optimization problem is a cost function that expresses a cost of operating the equipment in the central plant as a function of control decisions associated with the equipment in the central plant.

In some embodiments, the cost function accounts for revenue generated by the central plant from selling resources or participating in incentive programs.

In some embodiments, operating the equipment in the central plant according to the optimization problem comprises executing the control decisions in a manner that minimizes the cost of operating the equipment in the central plant.

In some embodiments, iterating through the net list to find the one or more systems of interconnected equipment comprises removing common ground connections from the net list.

In some embodiments, generating the groups of the equipment based on the one or more cycles present within each of the one or more systems includes identifying two or more devices of the equipment that are connected in parallel with each other within one of the systems and grouping together the two or more devices that are connected in parallel with each other to form a single group.

In some embodiments, identifying two or more devices of the equipment that are connected in parallel with each other includes determining, for each cycle present within a system, whether the cycle can be transformed into another cycle within the system by swapping a first device of the cycle with a second device of the other cycle and identifying the first device and the second device as being connected in parallel in response to determining that the cycle can be transformed into the other cycle by swapping the first device with the second device.

Another implementation of the present disclosure is a central plant control system configured to serve one or more energy loads in a building. The central plant control system includes equipment configured to consume, produce, or store one or more resources including electricity, water, natural gas, steam, hot thermal energy, cold thermal energy, or electrical energy. The central plant control system further includes an asset allocator configured to receive an input model that describes a physical layout of the equipment of the central plant, create a net list that defines connections between the equipment of the central plant using the input model, discover one or more systems of interconnected equipment and one or more groups of equipment using the net list, formulate an optimization problem for the central plant using the systems and groups of equipment, and operate the equipment of the central plant according to the optimization problem.

In some embodiments, the optimization problem is a cost function that expresses a cost of operating the equipment as a function of control decisions associated with the equipment.

In some embodiments, the asset allocator is configured to operate the equipment according to the optimization problem by minimizing the cost of operating the equipment.

In some embodiments, the asset allocator is configured to remove common ground connections from the net list when discovering the one or more systems of interconnected equipment.

In some embodiments, the asset allocator is configured to discover the one or more groups of equipment by identifying two or more devices of the equipment that are connected in parallel with each other within one of the systems and grouping together the two or more devices that are connected in parallel with each other to form a single group.

In some embodiments, identifying two or more devices of the equipment that are connected in parallel with each other includes determining, for each cycle present within a system, whether the cycle can be transformed into another cycle within the system by swapping a first device of the cycle with a second device of the other cycle and identifying the first device and the second device as being connected in parallel in response to determining that the cycle can be transformed into the other cycle by swapping the first device with the second device.

Yet another implementation of the present disclosure is a central plant configured to serve one or more energy loads in a building. The central plant includes equipment configured to consume, produce, or store one or more resources including electricity, water, natural gas, steam, hot thermal energy, cold thermal energy, or electrical energy. The central plant further includes an asset allocator configured to receive an input model that describes a physical layout of the equipment of the central plant, discover one or more systems of interconnected equipment and one or more groups of equipment using the input model, formulate an optimization problem for the central plant using the systems and groups of equipment, and operate the equipment of the central plant according to the optimization problem.

In some embodiments, the optimization problem is a cost function that expresses a cost of operating the equipment as a function of control decisions associated with the equipment.

In some embodiments, the asset allocator is configured to discover the one or more groups of equipment by identifying two or more devices of the equipment that are connected in parallel with each other within one of the systems and grouping together the two or more devices that are connected in parallel with each other to form a single group.

In some embodiments, identifying two or more devices of the equipment that are connected in parallel with each other includes determining, for each cycle present within a system, whether the cycle can be transformed into another cycle within the system by swapping a first device of the cycle with a second device of the other cycle and identifying the first device and the second device as being connected in parallel in response to determining that the cycle can be transformed into the other cycle by swapping the first device with the second device.

Another implementation of the present disclosure is a control system for equipment that operate to produce, consume, or store one or more resources. The control system includes one or more processing circuits configured to obtain modeling input describing a physical layout of the equipment. The modeling input may indicate a bidirectional connection between the equipment. The one or more processing circuits are configured to determine one or more cycles formed by the equipment based on the modeling input. A cycle includes a path of directed connections between the equipment that forms a closed loop. The one or more processing circuits are configured to formulate a control problem using the one or more cycles formed by the equipment and operate the equipment according to the control problem.

In some embodiments, the modeling input indicates the bidirectional connection between a first device of the equipment and a second device of the equipment. The bidirectional connection may permit movement of the one or more resources in both a first direction along the bidirectional connection from the first device to the second device and a second direction along the bidirectional connection from the second device to the first device.

In some embodiments, the one or more cycles include a first cycle in which the one or more resources move in a first direction along the bidirectional connection and a second cycle in which the one or more resources move in a second direction along the bidirectional connection opposite the first direction.

In some embodiments, formulating the control problem includes generating a constraint based on the one or more cycles. Operating the equipment according to the control problem may include using the constraint to generate a set of control decisions for the equipment in accordance with the constraint.

In some embodiments, the path of directed connections includes the bidirectional connection between a first device of the equipment and a second device of the equipment and a unidirectional connection between the second device of the equipment and a third device of the equipment.

In some embodiments, determining the one or more cycles formed by the equipment includes generating a constraint that requires the one or more resources to move along the path of directed connections in a direction specified by the directed connections and excluding a non-compliant cycle from the one or more cycles in response to determining that the non-compliant cycle requires the one or more resources to move along the path of directed connections in a direction that violates the constraint.

In some embodiments, the modeling input indicates a port of the equipment is a bidirectional port capable of both receiving the one or more resources as an input and providing the one or more resources as an output. Determining the one or more cycles may include determining a first cycle in which the bidirectional port is an input port and a second cycle in which the bidirectional port is an output port.

Another implementation of the present disclosure is a control system for equipment that operate to produce, consume, or store one or more resources. The control system includes one or more processing circuits configured to obtain modeling input describing a physical layout of the equipment. The modeling input may indicate a bidirectional port of the equipment. The one or more processing circuits are configured to determine one or more cycles formed by the equipment based on the modeling input. A cycle may include a path of directed connections between the equipment that forms a closed loop. The one or more processing circuits are configured to formulate a control problem using the one or more cycles formed by the equipment and operate the equipment according to the control problem.

In some embodiments, the modeling input indicates the bidirectional port on a first device of the equipment. The bidirectional port may permit providing the one or more resources as an input to the first device of the equipment via the bidirectional port and as an output of the first device of the equipment via the bidirectional port.

In some embodiments, the one or more cycles include a first cycle in which the bidirectional port functions as an input port through which the one or more resources are provided as an input to a first device of the equipment and a second cycle in which the bidirectional port functions as an output port through which the one or more resources are provided as an output from the first device of the equipment.

In some embodiments, formulating the control problem includes generating a constraint based on the one or more cycles. Operating the equipment according to the control problem may include using the constraint to generate a set of control decisions for the equipment in accordance with the constraint.

In some embodiments, the path of directed connections includes the bidirectional port on a first device of the equipment and a unidirectional port on a second device of the equipment.

In some embodiments, determining the one or more cycles formed by the equipment includes generating a constraint that requires the one or more resources to move into a first device of the equipment or out of the first device of the equipment in a direction specified by a unidirectional port of the first device and excluding a non-compliant cycle from the one or more cycles in response to determining that the non-compliant cycle requires the one or more resources to move into the first device of the equipment or out of the first device of the equipment in a direction that violates the constraint.

In some embodiments, the modeling input indicates a bidirectional connection between a first device of the equipment and a second device of the equipment. Determining the one or more cycles may include determining a first cycle in which the one or more resources move in a first direction along the bidirectional connection and a second cycle in which the one or more resources move in a second direction along the bidirectional connection opposite the first direction.

Another implementation of the present disclosure is a method for operating equipment to consume, produce, or store one or more resources. The method includes obtaining modeling input describing a physical layout of the equipment. The modeling input may indicate a bidirectional connection between the equipment or a bidirectional port of the equipment. The method includes determining one or more cycles formed by the equipment based on the modeling input. A cycle may include a path of directed connections between the equipment that forms a closed loop. The method includes formulating a control problem using the one or more cycles formed by the equipment and operating the equipment according to the control problem.

In some embodiments, the modeling input indicates the bidirectional connection between a first device of the equipment and a second device of the equipment. The bidirectional connection may permit movement of the one or more resources in both a first direction along the bidirectional connection from the first device to the second device and a second direction along the bidirectional connection from the second device to the first device.

In some embodiments, the modeling input indicates the bidirectional port on a first device of the equipment. The bidirectional port may permit providing the one or more resources as an input to the first device of the equipment via the bidirectional port and as an output of the first device of the equipment via the bidirectional port.

In some embodiments, the one or more cycles include a first cycle in which the one or more resources move in a first direction along the bidirectional connection or through the bidirectional port and a second cycle in which the one or more resources move in a second direction along the bidirectional connection or through the bidirectional port opposite the first direction.

In some embodiments, determining the one or more cycles formed by the equipment includes generating a constraint that requires the one or more resources to move along the path of directed connections in a direction specified by a unidirectional connection or unidirectional port along the path of directed connections. The method may include excluding a non-compliant cycle from the one or more cycles in response to determining that the non-compliant cycle requires the one or more resources to move along the path of directed connections in a direction that violates the constraint.

In some embodiments, formulating the control problem includes generating a constraint based on the one or more cycles. Operating the equipment according to the control problem may include using the constraint to generate a set of control decisions for the equipment in accordance with the constraint.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
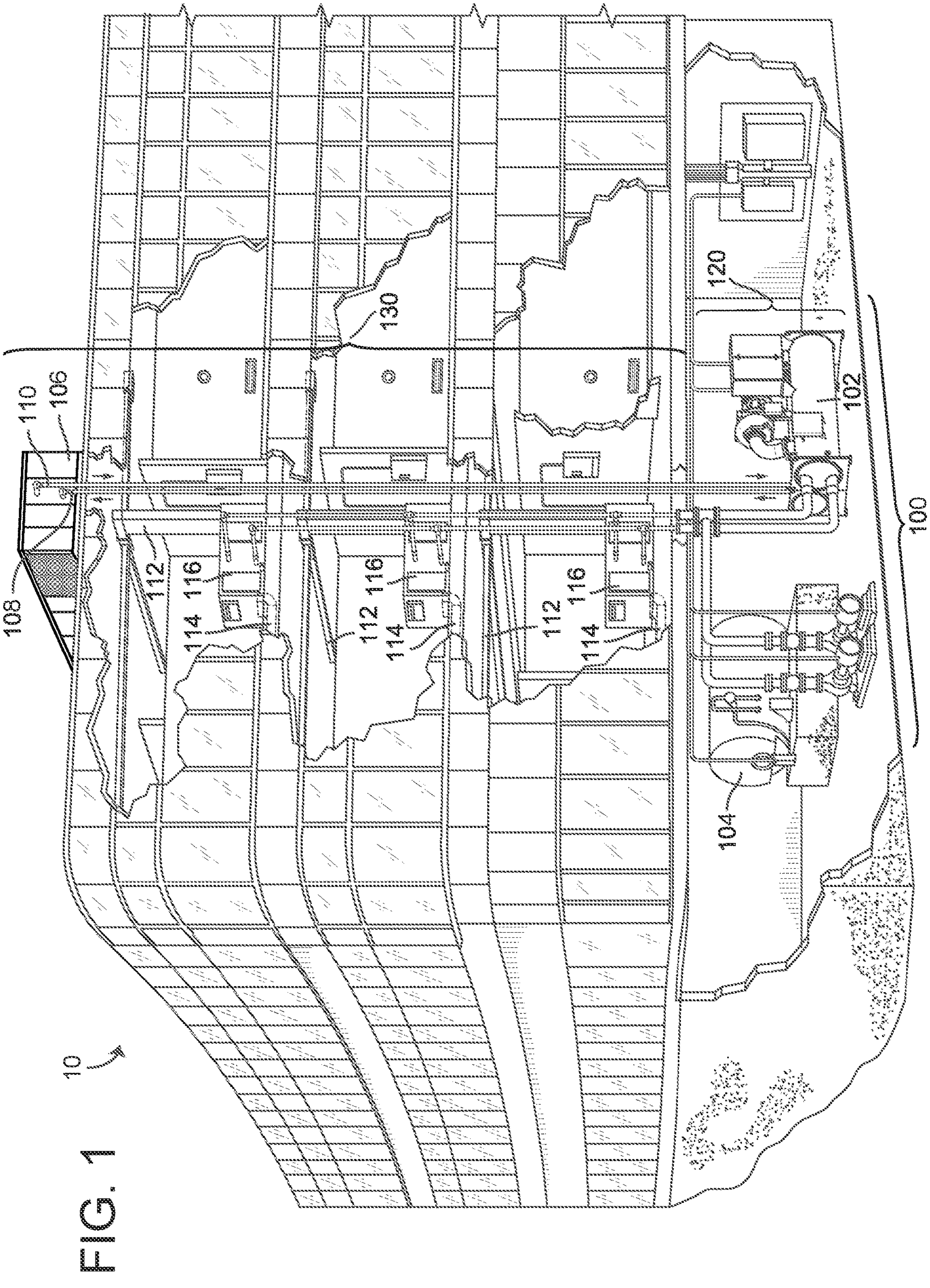
FIG. 1 is a drawing of a building equipped with a HVAC system, according to an exemplary embodiment.

Referring generally to the FIGURES, a central plant with an asset allocator configured to automatically formulate an economic optimization problem and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function J(x) that expresses economic cost as a function of the control decisions made by the asset allocator. The cost function J(x) may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process to determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period.

In some embodiments, the asset allocator uses an economic model predictive control strategy to optimize a set of control decisions. When given a model containing the physical layout of a central plant or other equipment, the asset allocator can automatically formulate the EMPC problem. The method used to formulate this problem involves breaking down the input model into unique systems and grouping equipment together wherever possible. More detail about this process is described below.

The systems and methods described herein provide significant advantages over previous approaches to optimizing the operation of a central plant. Before computer technology, it was not possible to operate a central plant according to an optimization problem as described in the present disclosure. Humans could not formulate such a problem or solve such a problem fast enough to operate a central plant accordingly. As such, the present disclosure describes new systems and methods for operating a central plant in a manner that is more efficient than previous approaches, especially approaches from before the advent of computer technology. The systems and methods described herein can result in significant cost savings for a central plant.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
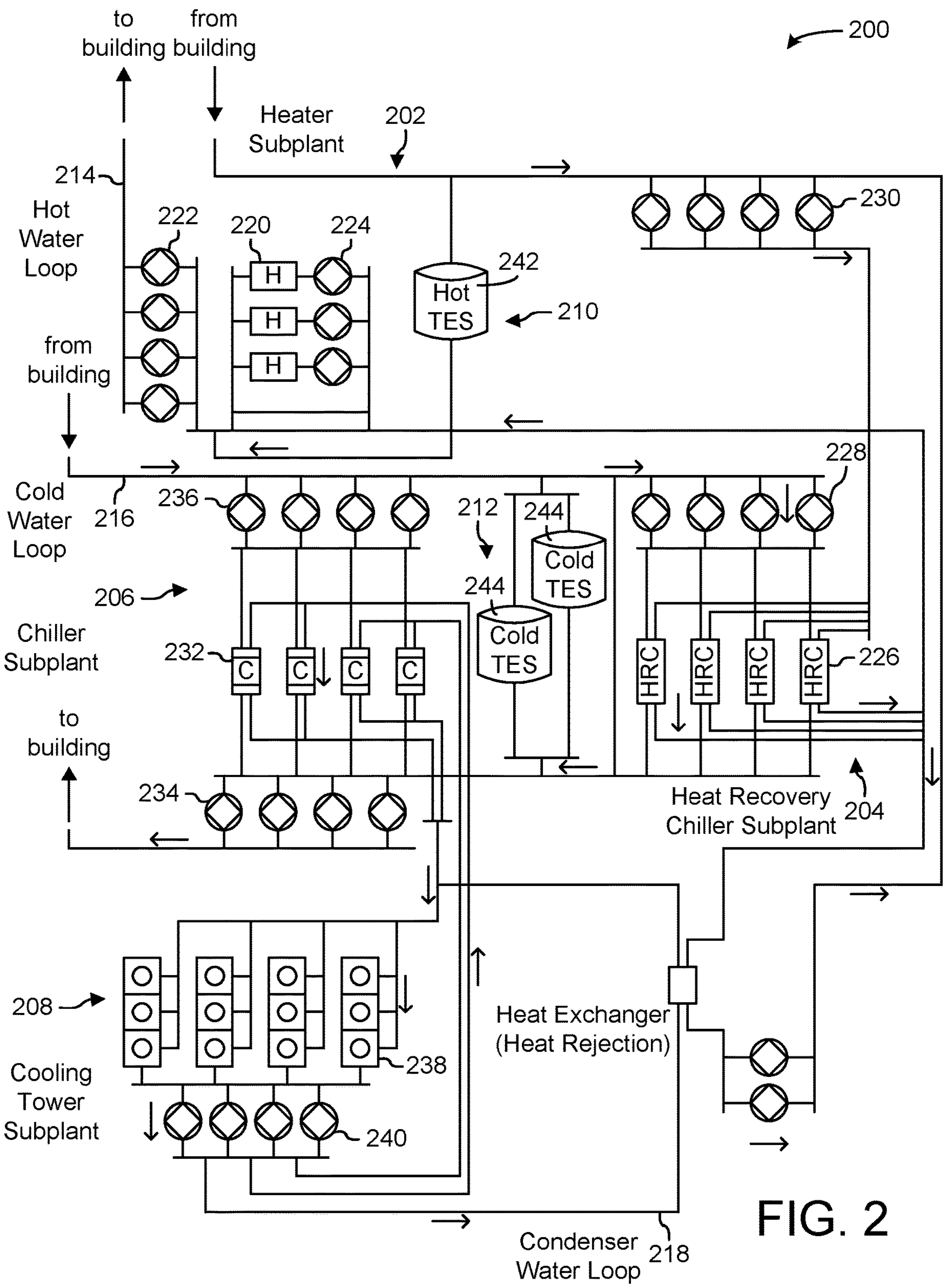
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
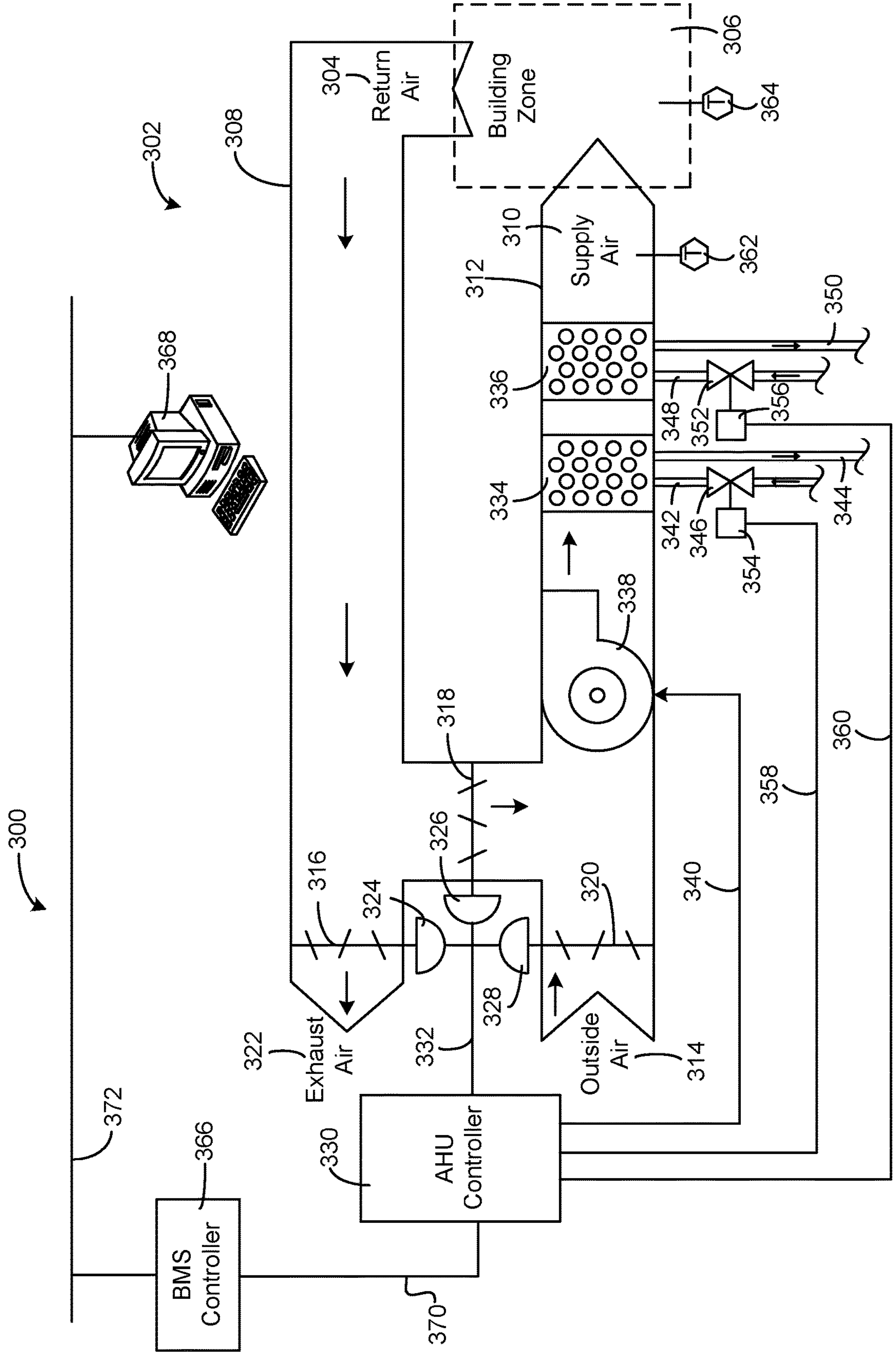
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping

350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
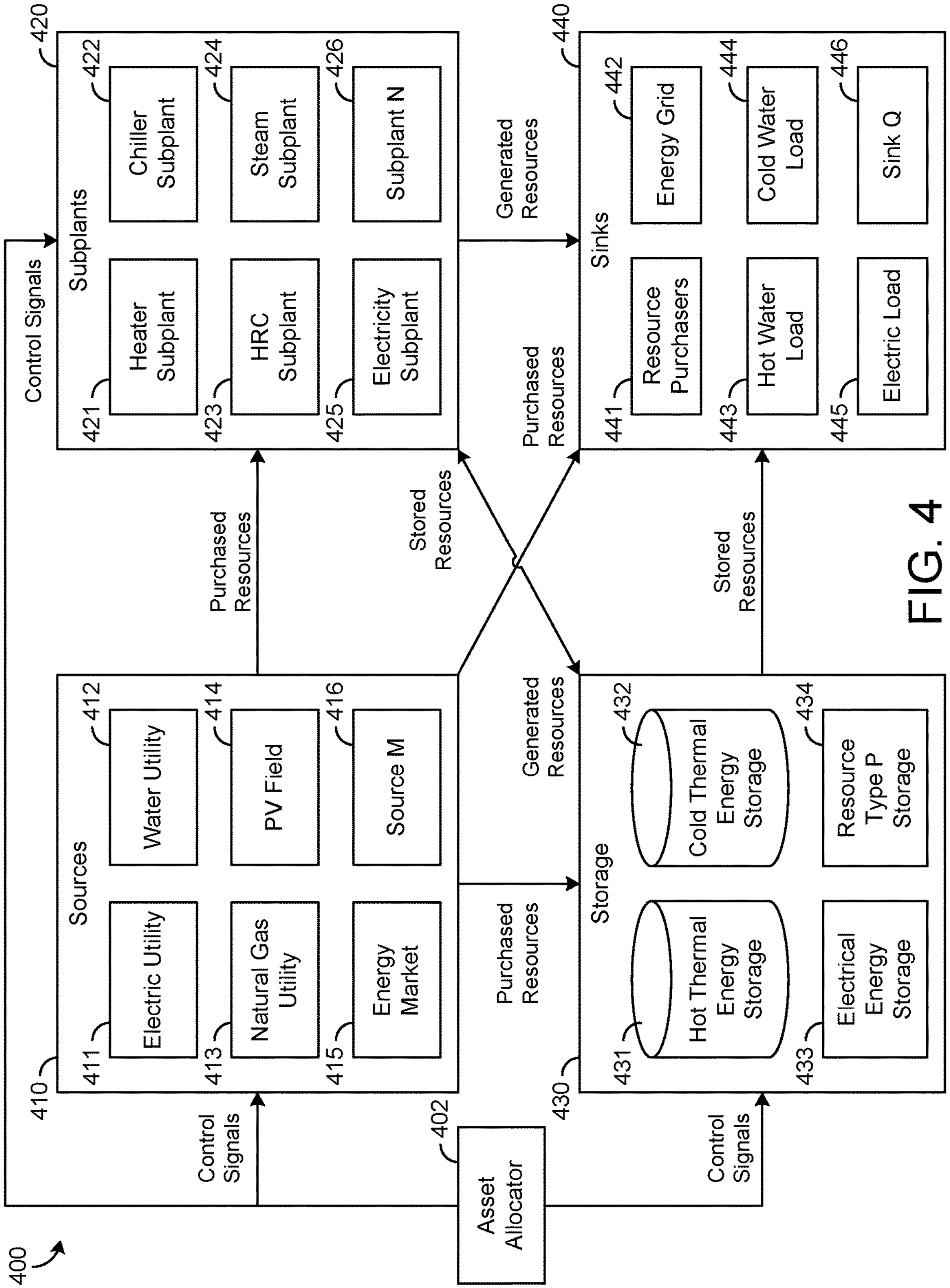
FIG. 4 is a block diagram of an asset allocation system including sources, subplants, storage, sinks, and an asset allocator configured to optimize the allocation of these assets, according to an exemplary embodiment.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7-8) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process to determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\sum x_{time} = 0 \quad \forall \text{ resources}, \forall \text{ time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function (x) that expresses economic cost as a function of the control decisions made by asset allocator 402. The cost function J (x) may account for the cost of resources purchased from sources 410, as well as the revenue generated by selling resources to resource purchasers 441 or energy grid 442 or participating in incentive programs. The cost optimization performed by asset allocator 402 can be expressed as:

$$\arg\min_x J(x)$$

where J (x) is defined as follows:

$$J(x) = \sum_{sources} \sum_{horizon} \text{cost}(\text{purchase}_{resource,time}, \text{time}) - \sum_{incentives} \sum_{horizon} \text{revenue}(\text{ReservationAmount})$$

The first term in the cost function J (x) represents the total cost of all resources purchased over the optimization horizon. Resources can include, for example, water, electricity, natural gas, or other types of resources purchased from a utility or other source 410. The second term in the cost function J (x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function (x) subject to the following constraint, which guarantees the balance between resources purchased, produced, discharged, consumed, and requested over the optimization horizon:

$$\sum_{sources} \text{purchase}_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0 \quad \forall\ resources,\ \forall\ time \in \text{horizon}$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant. These additional constraints can be generated and imposed by operational domain module 904 (described in greater detail with reference to FIG. 9).

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 402 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to the solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 402 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem (described in greater detail below).

Some decisions made by asset allocator 402 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 402 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Plant Resource Diagrams

Figure 5A:
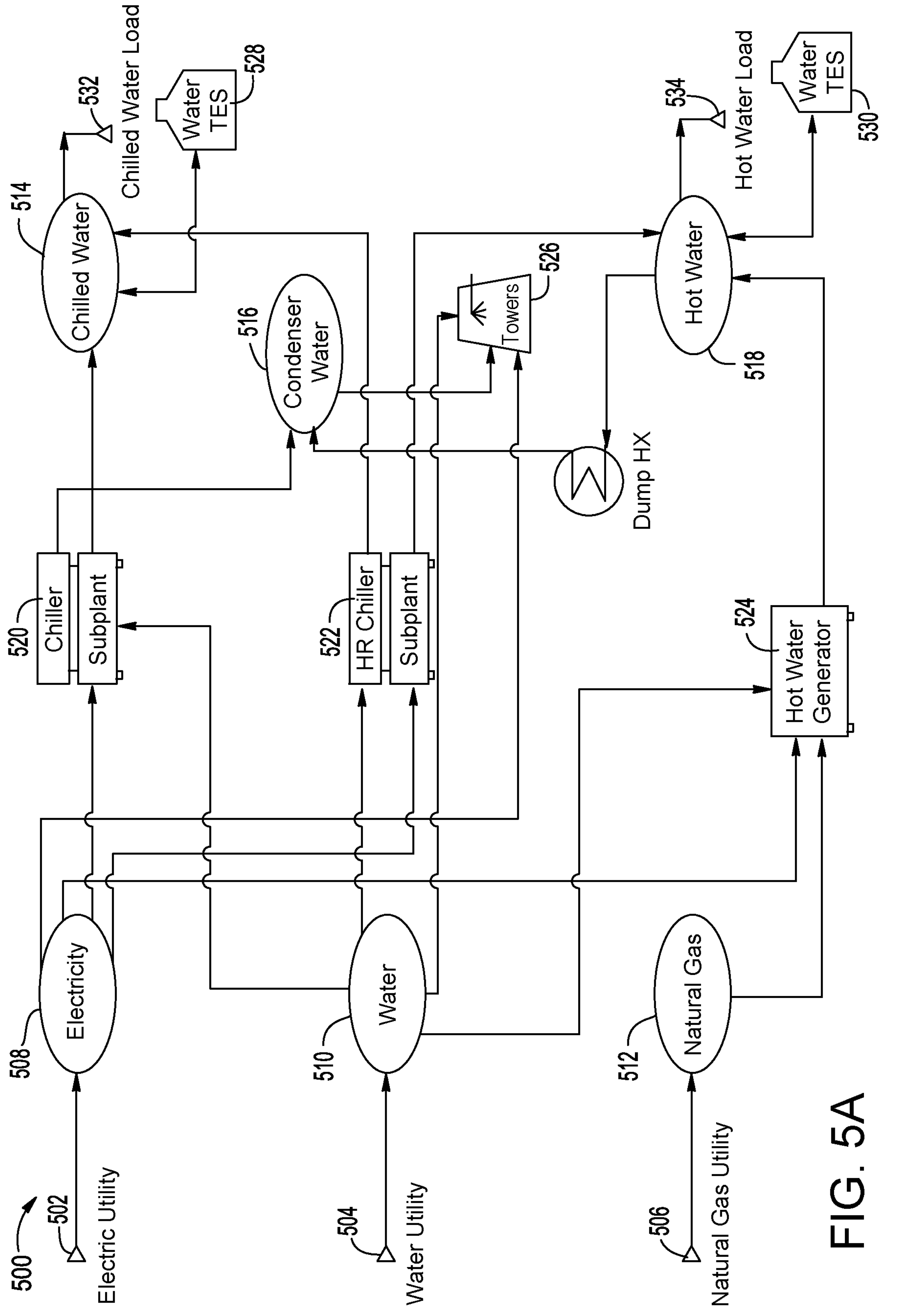
FIG. 5A is a plant resource diagram illustrating the elements of a central plant and the connections between such elements, according to an exemplary embodiment.

Referring now to FIG. 5A, a plant resource diagram 500 is shown, according to an exemplary embodiment. Plant resource diagram 500 represents a particular implementation of a central plant and indicates how the equipment of the central plant are connected to each other and to external systems or devices. Asset allocator 402 can use plant resource diagram 500 to identify the interconnections between various sources 410, subplants 420, storage 430, and sinks 440 in the central plant. In some instances, the interconnections defined by diagram 500 are not capable of being inferred based on the type of resource produced. For this reason, plant resource diagram 500 may provide asset allocator 402 with new information that can be used to establish constraints on the asset allocation problem.

Plant resource diagram 500 is shown to include an electric utility 502, a water utility 504, and a natural gas utility 506. Utilities 502-506 are examples of sources 410 that provide resources to the central plant. For example, electric utility 502 may provide an electricity resource 508, water utility 504 may provide a water resource 510, and natural gas utility 506 may provide a natural gas resource 512. The lines connecting utilities 502-506 to resources 508-512 along with the directions of the lines (i.e., pointing toward resources 508-512) indicate that resources purchased from utilities 502-506 add to resources 508-512.

Plant resource diagram 500 is shown to include a chiller subplant 520, a heat recovery (HR) chiller subplant 522, a hot water generator subplant 524, and a cooling tower subplant 526. Subplants 520-526 are examples of subplants 420 that convert resource types (i.e., convert input resources to output resources). For example, the lines connecting electricity resource 508 and water resource 510 to chiller subplant 520 indicate that chiller subplant 520 receives electricity resource 508 and water resource 510 as input resources. The lines connecting chiller subplant 520 to chilled water resource 514 and condenser water resource 516 indicate that chiller subplant 520 produces chilled water resource 514 and condenser water resource 516. Similarly, the lines connecting electricity resource 508 and water resource 510 to HR chiller subplant 522 indicate that HR chiller subplant 522 receives electricity resource 508 and water resource 510 as input resources. The lines connecting HR chiller subplant 522 to chilled water resource 514 and hot water resource 518 indicate that HR chiller subplant 522 produces chilled water resource 514 and hot water resource 518.

Plant resource diagram 500 is shown to include water TES 528 and 530. Water TES 528-530 are examples of storage 530 that can be used to store and discharge resources. The line connecting chilled water resource 514 to water TES 528 indicates that water TES 528 stores and discharges chilled water resource 514. Similarly, the line connecting hot water resource 518 to water TES 530 indicates that water TES 530 stores and discharges hot water resource 518. In diagram 500, water TES 528 is connected to only chilled water resource 514 and not to any of the other water resources 516 or 518. This indicates that water TES 528 can be used by asset allocator 402 to store and discharge only chilled water resource 514 and not the other water resources 516 or 518. Similarly, water TES 530 is connected to only hot water resource 518 and not to any of the other water resources 514 or 516. This indicates that water TES 530 can be used by asset allocator 402 to store and discharge only hot water resource 518 and not the other water resources 514 or 516.

Plant resource diagram 500 is shown to include a chilled water load 532 and a hot water load 534. Loads 532-534 are examples of sinks 440 that consume resources. The line connecting chilled water load 532 to chilled water resource 514 indicates that chilled water resource 514 can be used to satisfy chilled water load 532. Similarly, the line connecting hot water load 534 to hot water resource 518 indicates that hot water resource 518 can be used to satisfy hot water load 534. Asset allocator 402 can use the interconnections and limitations defined by plant resource diagram 500 to establish appropriate constraints on the optimization problem.

Figure 5B:
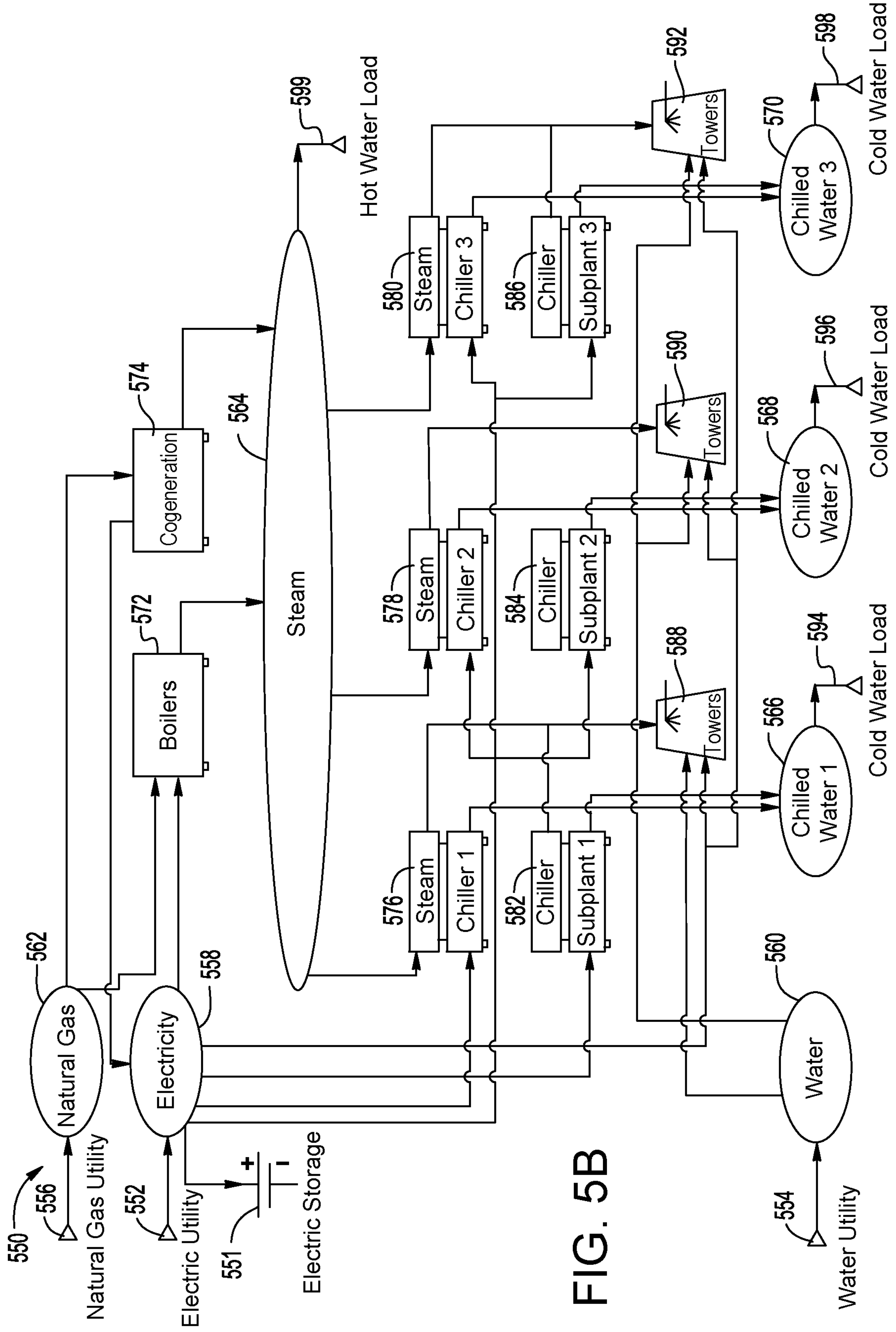
FIG. 5B is another plant resource diagram illustrating the elements of a central plant and the connections between such elements, according to an exemplary embodiment.

Referring now to FIG. 5B, another plant resource diagram 550 is shown, according to an exemplary embodiment. Plant resource diagram 550 represents another implementation of a central plant and indicates how the equipment of the central plant are connected to each other and to external systems or devices. Asset allocator 402 can use plant resource diagram 550 to identify the interconnections between various sources 410, subplants 420, storage 430, and sinks 440 in the central plant. In some instances, the interconnections defined by diagram 550 are not capable of being inferred based on the type of resource produced. For this reason, plant resource diagram 550 may provide asset allocator 402 with new information that can be used to establish constraints on the asset allocation problem.

Plant resource diagram 550 is shown to include an electric utility 552, a water utility 554, and a natural gas utility 556. Utilities 552-556 are examples of sources 410 that provide resources to the central plant. For example, electric utility 552 may provide an electricity resource 558, water utility 554 may provide a water resource 560, and natural gas utility 556 may provide a natural gas resource 562. The lines connecting utilities 552-556 to resources 558-562 along with the directions of the lines (i.e., pointing toward resources 558-562) indicate that resources purchased from utilities 552-556 add to resources 558-562. The line connecting electricity resource 558 to electrical storage 551 indicates that electrical storage 551 can store and discharge electricity resource 558.

Plant resource diagram 550 is shown to include a boiler subplant 572, a cogeneration subplant 574, several steam chiller subplants 576-580, several chiller subplants 582-586, and several cooling tower subplants 588-592. Subplants 572-592 are examples of subplants 420 that convert resource types (i.e., convert input resources to output resources). For example, the lines connecting boiler subplant 572 and cogeneration subplant 574 to natural gas resource 562, electricity resource 558, and steam resource 564 indicate that both boiler subplant 572 and cogeneration subplant 574 consume natural gas resource 562 and electricity resource 558 to produce steam resource 564.

The lines connecting steam resource 564 and electricity resource 558 to steam chiller subplants 576-580 indicate that each of steam chiller subplants 576-580 receives steam resource 564 and electricity resource 558 as input resources. However, each of steam chiller subplants 576-580 produces a different output resource. For example, steam chiller subplant 576 produces chilled water resource 566, steam chiller subplant 578 produces chilled water resource 568, and steam chiller subplant 580 produces chilled water resource 570. Similarly, the lines connecting electricity resource 558 to chiller subplants 582-586 indicate that each of chiller subplants 582-586 receives electricity resource 558 as an input. However, each of chiller subplants 582-586 produces a different output resource. For example, chiller subplant 582 produces chilled water resource 566, chiller subplant 584 produces chilled water resource 568, and chiller subplant 586 produces chilled water resource 570.

Chilled water resources 566-570 have the same general type (i.e., chilled water) but can be defined as separate resources by asset allocator 402. The lines connecting chilled water resources 566-570 to subplants 576-586 indicate which of subplants 576-586 can produce each chilled water resource 566-570. For example, plant resource diagram 550 indicates that chilled water resource 566 can only be produced by steam chiller subplant 576 and chiller subplant 582. Similarly, chilled water resource 568 can only be produced by steam chiller subplant 578 and chiller subplant 584, and chilled water resource 570 can only be produced by steam chiller subplant 580 and chiller subplant 586.

Plant resource diagram 550 is shown to include a hot water load 599 and several cold water loads 594-598. Loads 594-599 are examples of sinks 440 that consume resources. The line connecting hot water load 599 to steam resource 564 indicates that steam resource 564 can be used to satisfy hot water load 599. Similarly, the lines connecting chilled water resources 566-570 to cold water loads 594-598 indicate which of chilled water resources 566-570 can be used to satisfy each of cold water loads 594-598. For example, only chilled water resource 566 can be used to satisfy cold water load 594, only chilled water resource 568 can be used to satisfy cold water load 596, and only chilled water resource 570 can be used to satisfy cold water load 598. Asset allocator 402 can use the interconnections and limitations defined by plant resource diagram 550 to establish appropriate constraints on the optimization problem.

Central Plant Controller

Figure 6:
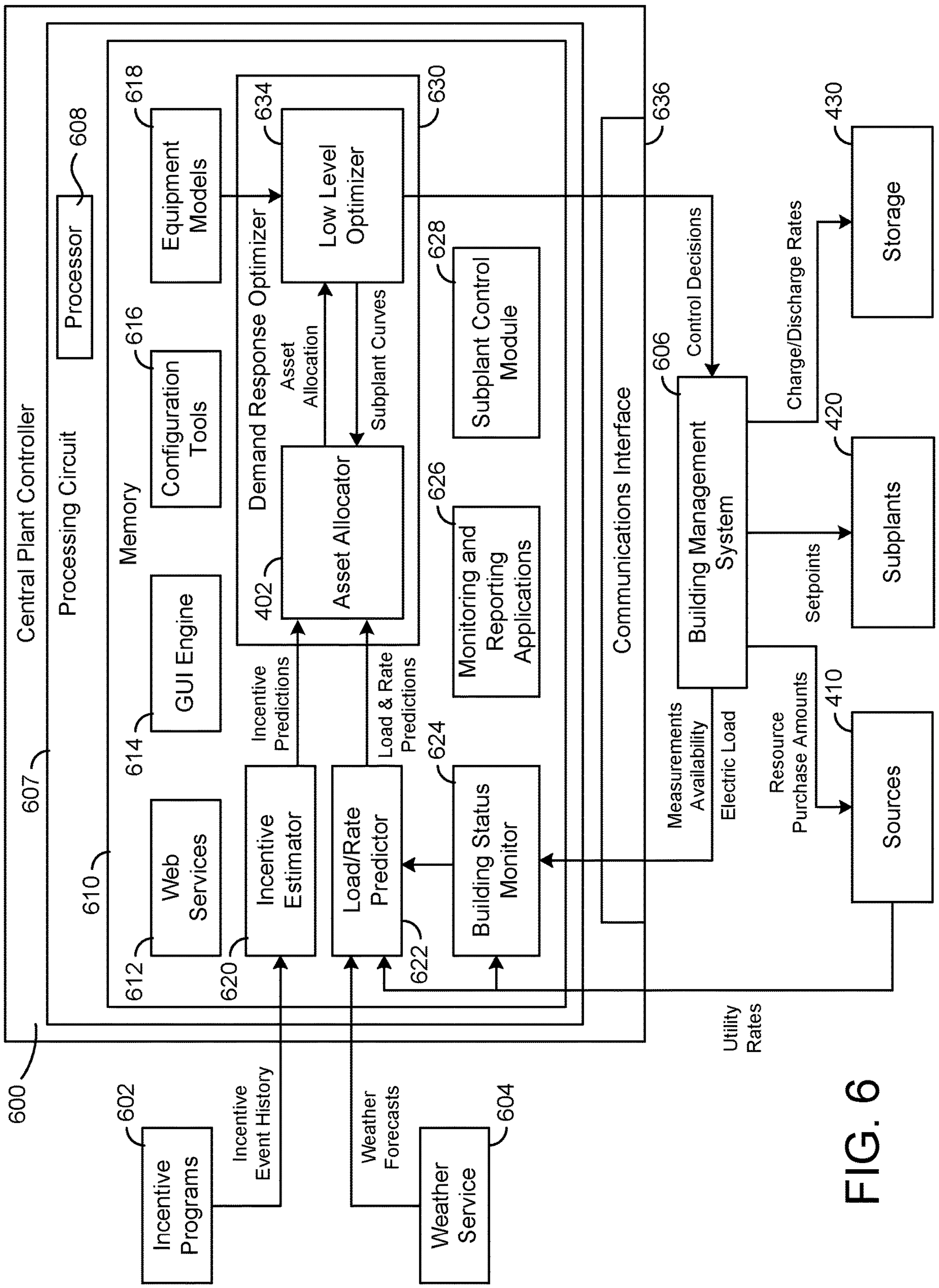
FIG. 6 is a block diagram of a central plant controller in which the asset allocator of FIG. 4 can be implemented, according to an exemplary embodiment.

Referring now to FIG. 6, a block diagram of a central plant controller 600 in which asset allocator 402 can be implemented is shown, according to an exemplary embodiment. In various embodiments, central plant controller 600 can be configured to monitor and control central plant 200, asset allocation system 400, and various components thereof (e.g., sources 410, subplants 420, storage 430, sinks 440, etc.). Central plant controller 600 is shown providing control decisions to a building management system (BMS) 606. The control decisions provided to BMS 606 may include resource purchase amounts for sources 410, setpoints for subplants 420, and/or charge/discharge rates for storage 430.

In some embodiments, BMS 606 is the same or similar to the BMS described with reference to FIG. 1. BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to central plant controller 600. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 420 and storage 430 to affect the monitored conditions within the building and to serve the thermal energy loads of the building.

BMS 606 may receive control signals from central plant controller 600 specifying on/off states, charge/discharge rates, and/or setpoints for the subplant equipment. BMS 606 may control the equipment (e.g., via actuators, power relays, etc.) in accordance with the control signals provided by central plant controller 600. For example, BMS 606 may operate the equipment using closed loop control to achieve the setpoints specified by central plant controller 600. In various embodiments, BMS 606 may be combined with central plant controller 600 or may be part of a separate building management system. According to an exemplary embodiment, BMS 606 is a METASYS® brand building management system, as sold by Johnson Controls, Inc.

Central plant controller 600 may monitor the status of the controlled building using information received from BMS 606. Central plant controller 600 may be configured to predict the thermal energy loads (e.g., heating loads, cooling loads, etc.) of the building for plurality of time steps in an optimization period (e.g., using weather forecasts from a weather service 604). Central plant controller 600 may also predict the revenue generation potential of incentive based demand response (IBDR) programs using an incentive event history (e.g., past clearing prices, mileage ratios, event probabilities, etc.) from incentive programs 602. Central plant controller 600 may generate control decisions that optimize the economic value of operating central plant 200 over the duration of the optimization period subject to constraints on the optimization process (e.g., energy balance constraints, load satisfaction constraints, etc.). The optimization process performed by central plant controller 600 is described in greater detail below.

In some embodiments, central plant controller 600 is integrated within a single computer (e.g., one server, one housing, etc.). In various other exemplary embodiments, central plant controller 600 can be distributed across multiple servers or computers (e.g., that can exist in distributed locations). In another exemplary embodiment, central plant controller 600 may integrated with a smart building manager that manages multiple building systems and/or combined with BMS 606.

Central plant controller 600 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between central plant controller 600 and various external systems or devices (e.g., BMS 606, subplants 420, storage 430, sources 410, etc.). For example, central plant controller 600 may receive information from BMS 606 indicating one or more measured states of the controlled building (e.g., temperature, humidity, electric loads, etc.) and one or more states of subplants 420 and/or storage 430 (e.g., equipment status, power consumption, equipment availability, etc.). Communications interface 636 may receive inputs from BMS 606, subplants 420, and/or storage 430 and may provide operating parameters (e.g., on/off decisions, setpoints, etc.) to subplants 420 and storage 430 via BMS 606. The operating parameters may cause subplants 420 and storage 430 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Central plant controller 600 may receive data regarding the overall building or building space to be heated or cooled by system 400 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Central plant controller 600 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from sources 410 (energy charge, demand charge, etc.).

Still referring to FIG. 6, memory 610 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t \mid Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 622.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of asset allocation system 400. For example, demand response optimizer 630 is shown to include asset allocator 402 and a low level optimizer 634. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by asset allocator 402. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by asset allocator 402. For example, if insufficient resources have been allocated to a particular IBDR program by asset allocator 402 or if the allocated resources have already been used, low level optimizer 634 may determine that asset allocation system 400 will not participate in the IBDR program and may ignore the IBDR event. However, if the required resources have been allocated to the IBDR program and are available in storage 430, low level optimizer 634 may determine that system 400 will participate in the IBDR program in response to the IBDR event. The cascaded optimization process performed by demand response optimizer 630 is described in greater detail in U.S. patent application Ser. No. 15/247,885.

In some embodiments, low level optimizer 634 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 634 generates the subplant curves by running the low level optimization process for various combinations of subplant loads and weather conditions to generate multiple data points. Low level optimizer 634 may fit a curve to the data points to generate the subplant curves. In other embodiments, low level optimizer 634 provides the data points asset allocator 402 and asset allocator 402 generates the subplant curves using the data points. Asset allocator 402 may store the subplant curves in memory for use in the high level (i.e., asset allocation) optimization process.

Figure 13:
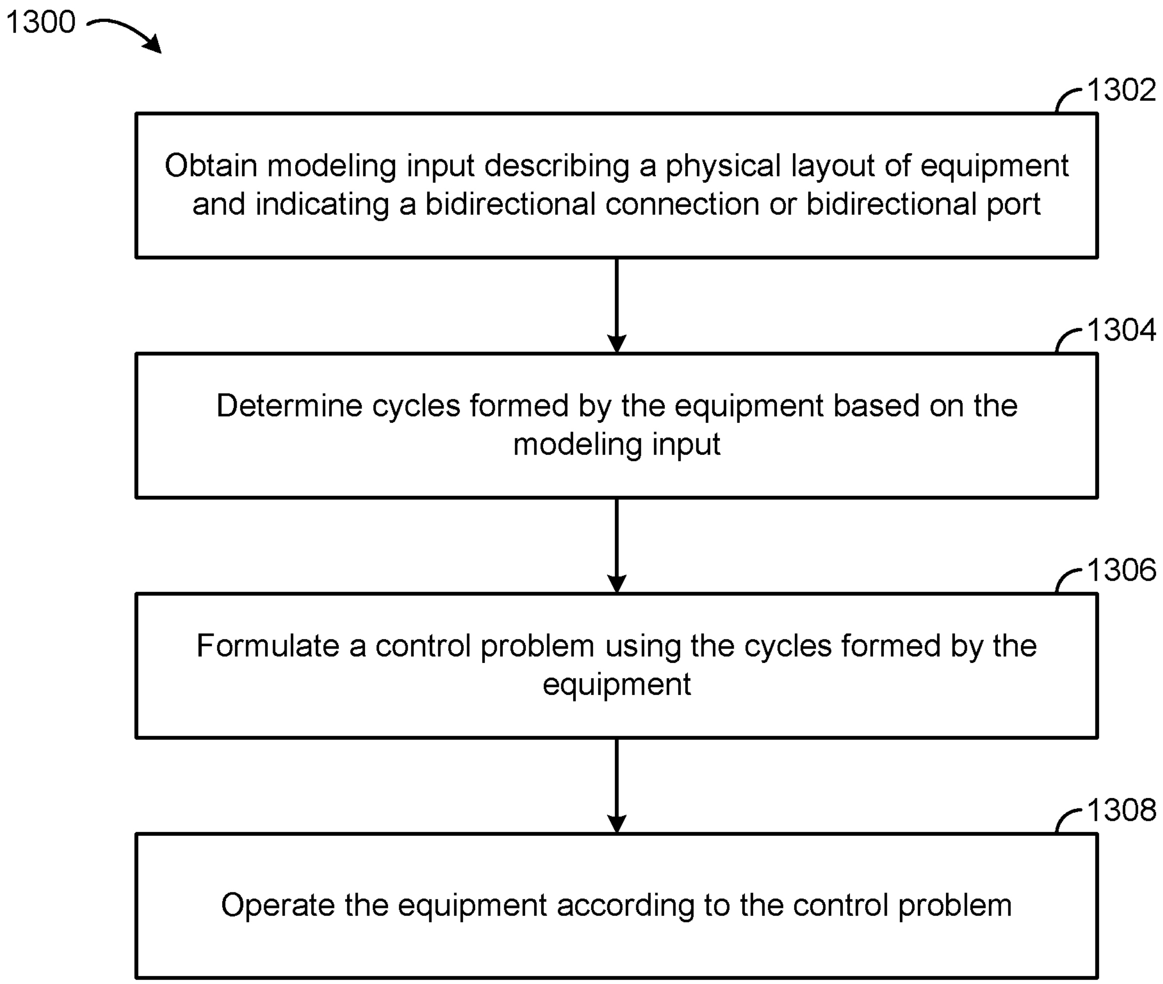
FIG. 13 is a flowchart of a process for automatically constructing and executing a control process for building equipment, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load. An example of such a subplant curve is shown in FIG. 13.

Still referring to FIG. 6, memory 610 is shown to include a subplant control module 628. Subplant control module 628 may store historical data regarding past operating statuses, past operating setpoints, and instructions for calculating and/or implementing control parameters for subplants 420 and storage 430. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 420, storage 430, and/or BMS 606 via communications interface 636. Subplant control module 628 may also receive and store on/off statuses and operating setpoints from low level optimizer 634.

Data and processing results from demand response optimizer 630, subplant control module 628, or other modules of central plant controller 600 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, central plant controller 600 may include one or more GUI servers, web services 612, or GUI engines 614 to support monitoring and reporting applications 626. In various embodiments, applications 626, web services 612, and GUI engine 614 may be provided as separate components outside of central plant controller 600 (e.g., as part of a smart building manager). Central plant controller 600 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 600 may be configured to provide the results of any such processing to other databases, tables, XML files, or other data structures for further querying, calculation, or access by, for example, external monitoring and reporting applications.

Central plant controller 600 is shown to include configuration tools 616. Configuration tools 616 can allow a user to define (e.g., via graphical user interfaces, via prompt-driven "wizards," etc.) how central plant controller 600 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
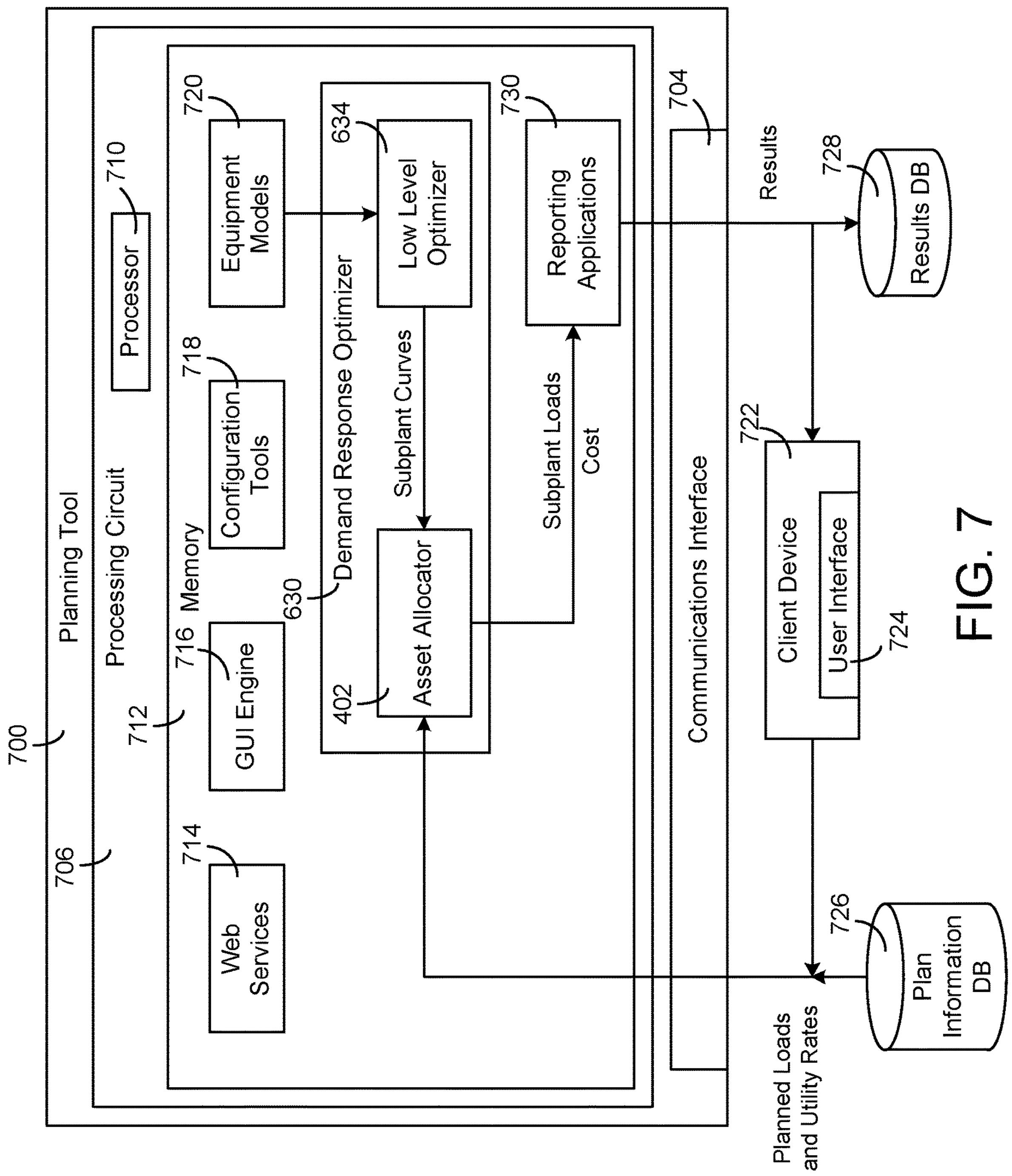
FIG. 7 is a block diagram of a planning tool in which the asset allocator of FIG. 4 can be implemented, according to an exemplary embodiment.

Referring now to FIG. 7, a block diagram of a planning tool 700 in which asset allocator 402 can be implemented is shown, according to an exemplary embodiment. Planning tool 700 may be configured to use demand response optimizer 630 to simulate the operation of a central plant over a predetermined time period (e.g., a day, a month, a week, a year, etc.) for planning, budgeting, and/or design considerations. When implemented in planning tool 700, demand response optimizer 630 may operate in a similar manner as described with reference to FIG. 6. For example, demand response optimizer 630 may use building loads and utility rates to determine an optimal resource allocation to minimize cost over a simulation period. However, planning tool 700 may not be responsible for real-time control of a building management system or central plant.

Planning tool 700 can be configured to determine the benefits of investing in a battery asset and the financial metrics associated with the investment. Such financial metrics can include, for example, the internal rate of return (IRR), net present value (NPV), and/or simple payback period (SPP). Planning tool 700 can also assist a user in determining the size of the battery which yields optimal financial metrics such as maximum NPV or a minimum SPP. In some embodiments, planning tool 700 allows a user to specify a battery size and automatically determines the benefits of the battery asset from participating in selected IBDR programs while performing PBDR. In some embodiments, planning tool 700 is configured to determine the battery size that minimizes SPP given the IBDR programs selected and the requirement of performing PBDR. In some embodiments, planning tool 700 is configured to determine the battery size that maximizes NPV given the IBDR programs selected and the requirement of performing PBDR.

In planning tool 700, asset allocator 402 may receive planned loads and utility rates for the entire simulation period. The planned loads and utility rates may be defined by input received from a user via a client device 722 (e.g., user-defined, user selected, etc.) and/or retrieved from a plan information database 726. Asset allocator 402 uses the planned loads and utility rates in conjunction with subplant curves from low level optimizer 634 to determine an optimal resource allocation (i.e., an optimal dispatch schedule) for a portion of the simulation period.

The portion of the simulation period over which asset allocator 402 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, asset allocator 402 requests all of the subplant curves used in the simulation from low level optimizer 634 at the beginning of the simulation. Since the planned loads and environmental conditions are known for the entire simulation period, asset allocator 402 may retrieve all of the relevant subplant curves at the beginning of the simulation. In some embodiments, low level optimizer 634 generates functions that map subplant production to equipment level production and resource use when the subplant curves are provided to asset allocator 402. These subplant to equipment functions may be used to calculate the individual equipment production and resource use (e.g., in a post-processing module) based on the results of the simulation.

Still referring to FIG. 7, planning tool 700 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 700 and various external systems or devices (e.g., client device 722, results database 728, plan information database 726, etc.). For example, planning tool 700 may receive planned loads and utility rates from client device 722 and/or plan information database 726 via communications interface 704. Planning tool 700 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 700 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIG. 6. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
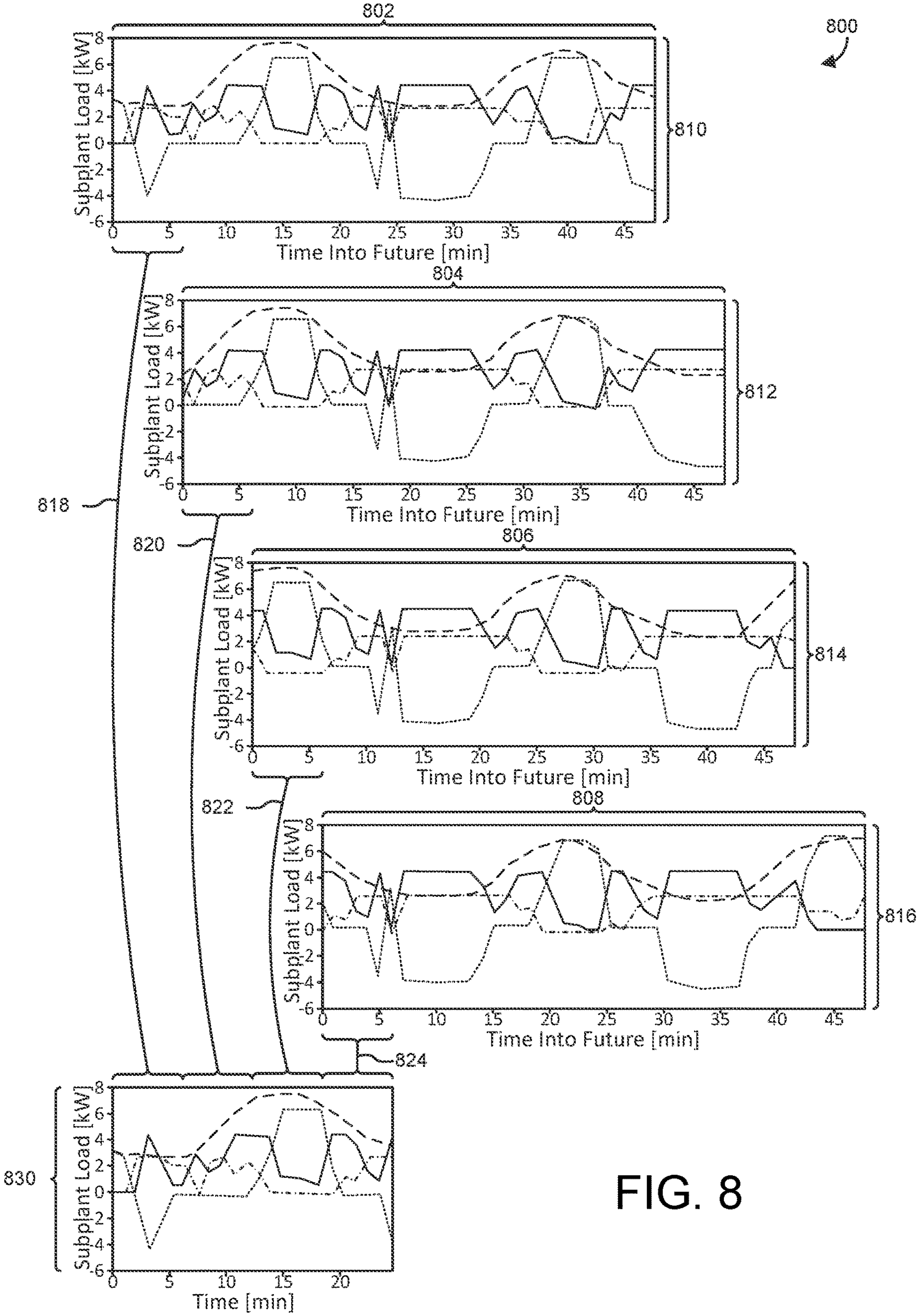
FIG. 8 is a flow diagram illustrating an optimization process which can be performed by the planning tool of FIG. 7, according to an exemplary embodiment.

Referring now to FIG. 8, several graphs 800 illustrating the operation of planning tool 700 are shown, according to an exemplary embodiment. With each iteration of the optimization process, planning tool 700 selects an optimization period (i.e., a portion of the simulation period) over which the optimization is performed. For example, planning tool 700 may select optimization period 802 for use in the first iteration. Once the optimal resource allocation 810 has been determined, planning tool 700 may select a portion 818 of resource allocation 810 to send to plant dispatch 830. Portion 818 may be the first b time steps of resource allocation 810. Planning tool 700 may shift the optimization period 802 forward in time, resulting in optimization period 804. The amount by which the prediction window is shifted may correspond to the duration of time steps b.

Planning tool 700 may repeat the optimization process for optimization period 804 to determine the optimal resource allocation 812. Planning tool 700 may select a portion 820 of resource allocation 812 to send to plant dispatch 830. Portion 820 may be the first b time steps of resource allocation 812. Planning tool 700 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Asset Allocator

Figure 9:
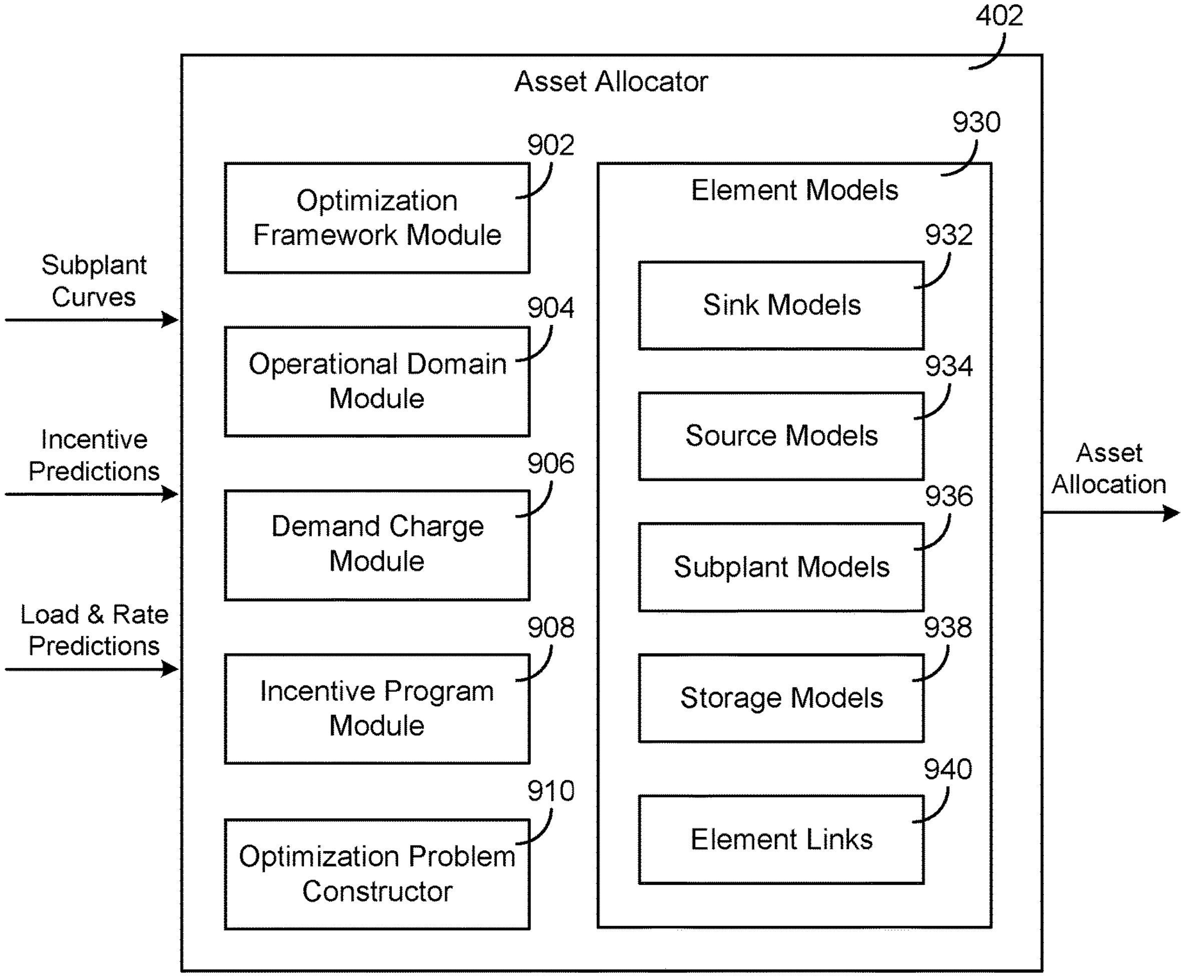
FIG. 9 is a block diagram illustrating the asset allocator of FIG. 4 in greater detail, according to an exemplary embodiment.

Referring now to FIG. 9, a block diagram illustrating asset allocator 402 in greater detail is shown, according to an exemplary embodiment. Asset allocator 402 may be configured to control the distribution, production, storage, and usage of resources in a central plant. As discussed above, asset allocator 402 can be configured to minimize the economic cost (or maximize the economic value) of operating a central plant over the duration of the optimization period. The economic cost may be defined by a cost function (x) that expresses economic cost as a function of the control decisions made by asset allocator 402. The cost function J (x) may account for the cost of resources purchased from sources 410, as well as the revenue generated by selling resources to resource purchasers 441 or energy grid 442 or participating in incentive programs.

In some embodiments, asset allocator 402 performs an optimization process to determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, asset allocator 402 is configured to optimally dispatch all campus energy assets in order to meet the requested heating, cooling, and electrical loads of the campus for each time step within the optimization period.

Throughout this disclosure, asset allocator 402 is described as actively identifying or defining various items (e.g., sources 410, subplants 420, storage 430, sinks 440, operational domains, etc.). However, it should be understood that asset allocator 402 can also, or alternatively, receive such items as inputs. For example, the existence of such items can be defined by a user (e.g., via a user interface) or any other data source (e.g., another algorithm, an external system or process, etc.). Asset allocator 402 can be configured to identify which of these items have been defined or identified and can generate an appropriate cost function and optimization constraints based on the existence of these items. It should be understood that the acts of identifying or defining these items can include asset allocator 402 identifying, detecting, receiving, or otherwise obtaining a predefined item as an input.

Optimization Framework

Asset allocator 402 is shown to include an optimization framework module 902. Optimization framework module 902 can be configured to define an optimization framework for the optimization problem solved by asset allocator 402. In some embodiments, optimization framework module 902 defines the optimization problem as a mixed integer linear program (MILP). The MILP framework provides several advantages over the linear programming framework used in previous systems. For example, the MILP framework can account for minimum turndowns on equipment, can ensure that the high level optimization problem computes a point on the subplant curve for heat recovery chillers, and can impose logical constraints on the optimization problem to compensate for poor mechanical design and/or design inefficiencies.

In some embodiments, the MILP created by optimization framework module 902 has the following form:

$$\min_{x,z} c_x^T x + c_z^T z$$

subject to the following constraints:

$$A_x x + A_z z \leq b$$

$$H_x x + H_z z = g$$

$$z = \text{integer}$$

where $x \in \mathbb{R}^{n_x}$ is a vector of the continuous decision variables, $Z \in \mathbb{Z}^{n_z}$ is a vector of the integer decision variables, $c_x$ and $c_z$ are the respective cost vectors for the continuous decision variables and integer decision variables, $A_x$, $A_z$, and b are the matrices and vector that describe the inequality constraints, and $H_x$, $H_z$, and g are the matrices and vector that describe the equality constraints.

Optimization Problem Construction

Still referring to FIG. 9, asset allocator 402 is shown to include an optimization problem constructor 910. Optimization problem constructor 910 can be configured to construct the high level (i.e., asset allocation) optimization problem solved by asset allocator 402. In some embodiments, the high level optimization problem includes one or more of the elements of asset allocation system 400. For example, the optimization problem can include sinks 440, sources 410, subplants 420, and storage 430, as described with reference to FIG. 4. In some embodiments, the high level optimization problem includes airside units, which can be considered a type of energy storage in the mass of the building. The optimization problem may include site-specific constraints that can be added to compensate for mechanical design deficiencies.

In some embodiments, the optimization problem generated by optimization problem constructor 910 includes a set of links between sources 410, subplants 420, storage 430, sinks 440, or other elements of the optimization problem. For example, the high level optimization problem can be viewed as a directed graph, as shown in FIGS. 5A-5B. The nodes of the directed graph can include sources 410, subplants 420, storage 430, and sinks 440. The set of links can define the connections between the nodes, the cost of the connections between nodes (e.g., distribution costs), the efficiency of each connection, and the connections between site-specific constraints.

In some embodiments, the optimization problem generated by optimization problem constructor 910 includes an objective function. The objective function can include the sum of predicted utility usage costs over the horizon (i.e., the optimization period), the predicted demand charges, the total predicted incentive revenue over the prediction horizon, the sum of the predicted distribution costs, the sum of penalties on unmet and overmet loads over the prediction horizon, and/or the sum of the rate of change penalties over the prediction horizon (i.e., delta load penalties). All of these terms may add to the total cost, with the exception of the total predicted incentive revenue. The predicted incentive revenue may subtract from the total cost. For example, the objective function generated by optimization problem constructor 910 may have the following form:

$$J(x) = \sum_{k=1}^{h} (\text{Source Usage Cost})_k + (\text{Total Demand Charges}) - (\text{Total Incentives}) + \sum_{k=1}^{h} (\text{Distribution Cost})_k + \sum_{k=1}^{h} (\text{Unmet/Overmet Load Penalties})_k + \sum_{k=1}^{h} (\text{Rate of Change Penalties})_k$$

where the index k denotes a time step in the optimization period and h is the total number of time steps in the optimization period.

In some embodiments, the optimization problem generated by optimization problem constructor 910 includes a set of constraints. The set of constraints can include resource balance constraints (e.g., hot water balance, chilled water balance, electricity balance, etc.), operational domain constraints for each of subplants 420, state of charge (SOC) and storage capacity constraints for each of storage 430, decision variable constraints (e.g., subplant capacity constraints, charge and discharge of storage constraints, and storage capacity constraints), demand/peak usage constraints, auxiliary constraints, and any site specific or commissioned constraints. In some embodiments, the operational domain constraints are generalized versions of the subplant curves. The operational domain constraints can be generated by operational domain module 904 (described in greater detail below). The decision variable constraints may be box constraints of the form $x_{lb} \leq x \leq x_{ub}$, where x is a decision variable and $x_{lb}$ and $x_{ub}$ are the lower and upper bound for the decision variable x.

The optimization problem generated by optimization problem constructor 910 can be considered a finite-horizon optimal control problem. The optimization problem may take the form:

$$\text{minimize } J(x)$$

subject to resource balances, operational domains for subplants 420 (e.g., subplant curves), constraints to predict the SOC of storage 430, storage capacity constraints, subplant/storage box constraints (e.g., capacity constraints and discharge/charge rate constraints), demand/peak usage constraints, auxiliary constraints for rate of change variables, auxiliary constraints for demand charges, and site specific constraints.

In some embodiments, optimization problem constructor 910 applies an inventory balance constraint to each resource. One side of the inventory balance constraint for a given resource may include the total amount of the resource purchased from all sources 410, the total amount of the resource produced by all of subplants 420, the total amount of the resource discharged from storage 430 (negative values indicate charging storage 430), and unmet load. The other side of the inventory balance for the resource may include the total amount of the resource requested/predicted (uncontrolled load), carryover from the previous time step, the total amount of the resource consumed by all subplants 420 and airside units, overmet load, and the total amount of the resource sold. For example, the inventory balance for a resource may have the form:

$$\sum_{i \in \{Sources\}} (\text{Purchased Resource})_i + \sum_{j \in \{Subplants\}} (\text{Produced Resource})_j + \sum_{k \in \{Storage\}} (\text{Discharged Storage})_k + \text{Unmet Load} = \text{Requested Load} + \text{Carryover} + \sum_{j \in \{Subplants\}} (\text{Consumed Resource})_j \sum_{\iota \in \{Airside\ Units\}} (\text{Consumed Resource})_\iota + \text{Overmet Load} + \text{Resource Sold}$$

Optimization problem constructor 910 may require this resource balance to be satisfied for each resource at each time step of the optimization period. Together the unmet and overmet load capture the accumulation of a resource. Negative accumulation (unmet load) are distinguished from positive accumulation (overmet load) because typically, overmet loads are not included in the resource balance. Even though unmet and overmet loads are listed separately, at most one of the two may be non-zero. The amount of carryover may be the amount of unmet/overmet load from the previous time step (described in greater detail below). The requested load may be determined by load/rate predictor 622 and provided as an input to the high level optimization problem.

Throughout this disclosure, the high level/asset allocator optimization problem or high level/asset allocator problem refers to the general optimization problem constructed by optimization problem constructor 910. A high level problem instance refers to a realization of the high level problem provided the input data and parameters. The high level optimization/asset allocation algorithm refers to the entire set of steps needed to solve a high level problem instance (i.e., encapsulates both the set of mathematical operations and the implementation or software design required to setup and solve a high level problem instance). Finally, a high level problem element or high level element refers to any of the elements of the high level problem including sinks 440, sources 410, subplants 420, storage 430, or airside unit.

Element Models

Still referring to FIG. 9, asset allocator 402 is shown to include element models 930. Element models 930 may store definitions and/or models for various elements of the high level optimization problem. For example, element models 930 are shown to include sink models 932, source models 934, subplant models 936, storage models 938, and element links 940. In some embodiments, element models 930 include data objects that define various attributes or properties of sinks 440, sources 410, subplants 420, and storage 430 (e.g., using object-oriented programming).

For example, source models 934 may define the type of resource provided by each of sources 410, a cost of each resource, demand charges associated with the consumption of the resource, a maximum rate at which the resource can be purchased from each of sources 410, and other attributes of sources 410. Similarly, subplant models 936 may define the input resources of each subplant 420, the output resources of each subplant 420, relationships between the input and output variables of each subplant 420 (i.e., the operational domain of each subplant 420), and optimization constraints associated with each of subplants 420. Each of element models 930 are described in greater detail below.

Sink Models

Element models 930 are shown to include sink models 932. Sink models 932 may store models for each of sinks 440. As described above, sinks 440 may include resource consumers or requested loads. Some examples are the campus thermal loads and campus electricity usage. The predicted consumption of a sink 440 over the optimization period can be supplied as an input to asset allocator 401 and/or computed by load/rate predictor 622. Sink models 932 may store the predicted consumption over the optimization period for each of sinks 440. Sink models 932 may also store any unmet/overmet load for each of sinks 440, carryover from the previous time steps, and any incentives earned by supplying each of sinks 440 (e.g., for sinks such as an energy purchasers or an energy grid).

Carryover can be defined as the amount of unmet or overmet load for a particular resource from the previous time step. In some embodiments, asset allocator 402 determines the carryover by adding the entire unmet load for a particular resource in one time step to the requested load for the resource at the next time step. However, calculating the carryover in this manner may not always be appropriate since the carryover may grow over time. As an example, consider an unmet chilled water load. If there are several time steps where the chilled water load is not met, the buildings supplied by the load will heat up. Due to this increase in building temperature, the amount of chilled water load required to decrease the building temperature to the set-point is not a linearly increasing function of the sum of the unmet load over the past time steps because the building temperature will begin approaching the ambient temperature.

In some embodiments, asset allocator 402 adds a forgetting factor to the carryover. For example, asset allocator 402 can calculate the carryover for each time step using the following equation:

$$\text{carryover}_{j+1} = \gamma_j \cdot \text{unmet/overmet}_j$$

where $\text{unmet/overmet}_j$ is the amount of unmet and/or overmet load at time step j, $\text{carryover}_{j+1}$ is the carryover added to the right-hand side of the inventory balance at the next time step j+1, and $y_j \in [0,1]$ is the forgetting factor. Selecting $Y_j=0$ corresponds to case where no unmet/overmet load is carried over to the next time step, whereas selecting $Y_j=1$ corresponds to case where all unmet/overmet load is carried over to the next time step. An intermediate selection of $y_j$ (i.e., $0 \le y_j \le 1$) corresponds to the case where some, but not all, of the unmet/overmet load is carried over. For the case of a chilled water system, the choice of $y_j$ may depend on the plant itself and can be determined using the amount of unmet load that actually stored in the water (temperature would increase above the setpoint) when an unmet load occurs.

Source Models

Still referring to FIG. 9, element models 930 are shown to include source models 934. Source models 934 may store models for each of sources 410. As described above, sources 410 may include utilities or markets where resources may be purchased. Source models 934 may store a price per unit of a resource purchased from each of sources 410 (e.g., $/kWh of electricity, $/liter of water, etc.). This cost can be included as a direct cost associated with resource usage in the cost function. In some embodiments, source models 934 store costs associated with demand charges and demand constraints, incentive programs (e.g., frequency response and economic demand response) and/or sell back programs for one or more of sources 410.

In some embodiments, the cost function J(x) includes a demand charge based on peak electrical usage during a demand charge period (e.g., during a month). This demand charge may be based on the maximum rate of electricity usage at any time in the demand charge period. There are several other types of demand charges besides the anytime monthly demand charge for electricity including, for example, time-of-day monthly and yearlong ratchets. Some or all of these demand charges can be added to the cost function depending on the particular types of demand charges imposed by sources 410. In some embodiments, demand charges are defined as follows:

$$wc \max_{i \in T_{demand}} \{x_i\}$$

where $x_i$ represents the resource purchase at time step i of the optimization period, c>0 is the demand charge rate, w is a (potentially time-varying) weight applied to the demand charge term to address any discrepancies between the optimization period and the time window over which the demand charge is applied, and $T_{demand} \subseteq \{1, \ldots, h\}$ is the subinterval of the optimization period to which the demand charge is applied. Source models 934 can store values for some or all of the parameters that define the demand charges and the demand charge periods.

In some embodiments, asset allocator 402 accounts for demand charges within a linear programming framework by introducing an auxiliary continuous variable. This technique is described in greater detail with reference to demand charge module 906. While this type of term may readily be cast into a linear programming framework, it can be difficult to determine the weighting coefficient w when the demand charge period is different from the optimization period. Nevertheless, through a judicious choice of the two adjustable parameters for demand charges (i.e., the weighting coefficient w and the initial value of the auxiliary demand variable), other types of demand charges may be included in the high level optimization problem.

In some embodiments, source models 934 store parameters of various incentive programs offered by sources 410. For example, the source definition 934 for an electric utility may define a capability clearing price, a performance clearing price, a regulation award, or other parameters that define the benefits (e.g., potential revenue) of participating in a frequency regulation program. In some embodiments, source models 934 define a decision variable in the optimization problem that accounts for the capacity of a battery reserved for frequency regulation. This variable effectively reduces the capacity of the battery that is available for priced-based demand response. Depending on the complexity of the decision, source models 934 may also define a decision variable that indicates whether to participate in the incentive program. In asset allocator 402, storage capacity may be reserved for participation in incentive programs. Low level optimizer 634 can then be used to control the reserved capacity that is charged/discharged for the incentive program (e.g., frequency response control).

In some embodiments, source models 934 store pricing information for the resources sold by sources 410. The pricing information can include time-varying pricing information, progressive or regressive resource prices (e.g., prices that depend on the amount of the resource purchased), or other types of pricing structures. Progressive and regressive resource prices may readily be incorporated into the optimization problem by leveraging the set of computational operations introduced by the operational domain. In the case of either a progressive rate that is a discontinuous function of the usage or for any regressive rate, additional binary variables can be introduced into the optimization problem to properly describe both of these rates. For progressive rates that are continuous functions of the usage, no binary variables are needed because one may apply a similar technique as that used for imposing demand charges.

In the cost function J(x), the following term can be used to describe progressive rates:

$$\max_{i \in \{1,2,3\}} \{p_i u + b_i\}$$

Since the goal is to minimize cost, this term can be equivalently described in the optimization problem by introducing an auxiliary continuous variable C and the following constraints:

$$C \geq 0$$
$$p_1 u + b_1 \leq C$$
$$p_2 u + b_2 \leq C$$
$$p_2 u + b_2 \leq C$$

where C is the auxiliary variable that is equal to the cost of the resource. Source models 934 can define these constraints in order to enable progressive rate structures in the optimization problem.

In some embodiments, source models 934 stores definitions of any fixed costs associated with resource purchases from each of sources 410. These costs can be captured within the MILP framework. For example, let $v \in \{0,1\}$ represent whether a source 410 is being utilized (v=0 means the source 410 is not used and v=1 means the source 410 is used) and let $u \in [0, u_{max}]$ be the source usage where $u_{max}$ represents the maximum usage. If the maximum usage is not known, $u_{max}$ may be any arbitrarily large number that satisfies $u<u_{max}$. Then, the following two constraints ensure that the binary variable v is zero when u=1 and is one when u>0:

$$u - u_{max} v \leq 0$$
$$u \geq 0$$

Asset allocator 402 can add the term $c_{fixed}v$ to the cost function to account for fixed costs associated with each of sources 410, where $c_{fixed}$ is the fixed cost. Source models 934 can define these constraints and terms in order to account for fixed costs associated with sources 410.

Subplant Models

Referring again to FIG. 9, element models 930 are shown to include subplant models 936. Subplant models 936 may store models for each of subplants 420. As discussed above, subplants 420 are the main assets of a central plant. Subplants 420 can be configured to convert resource types, making it possible to balance requested loads from the building or campus using resources purchased from sources 410. This general definition allows for a diverse set of central plant configurations and equipment types as well as varying degrees of subplant modeling fidelity and resolution.

In some embodiments, subplant models 936 identify each of subplants 420 as well as the optimization variables associated with each subplant. The optimization variables of a subplant can include the resources consumed, the resources produced, intrinsic variables, and extrinsic variables. Intrinsic variables may be internal to the optimization formulation and can include any auxiliary variables used to formulate the optimization problem. Extrinsic variables may be variables that are shared among subplants (e.g., condenser water temperature).

In some embodiments, subplant models 936 describe the relationships between the optimization variables of each subplant. For example, subplant models 936 can include subplant curves that define the output resource production of a subplant as a function of one or more input resources provided to the subplant. In some embodiments, operational domains are used to describe the relationship between the subplant variables. Mathematically, an operational domain is a union of a collection of polytopes in an n-dimensional (real) space that describe the admissible set of variables of a high level element. Operational domains are described in greater detail below.

In some embodiments, subplant models 936 store subplant constraints for each of subplants 420. Subplant constraints may be written in the following general form:

$$A_{x,j} x_j + A_{z,j} z_j \leq b_j$$
$$H_{x,j} x_j + H_{z,j} z_j = g_j$$
$$x_{lb,j} \leq x_j \leq x_{ub,j}$$
$$z_{lb,j} \leq z_j \leq z_{ub,j}$$
$$z_j = \text{integer}$$

for all j where j is an index representing the jth subplant, $x_j$ denotes the continuous variables associated with the jth subplant (e.g., resource variables and auxiliary optimization variables), and $z_j$ denotes the integer variables associated with the jth subplant (e.g., auxiliary binary optimization variables). The vectors $x_{ib,j}$, $x_{ub,j}$, $z_{ub,j}$, and $z_{ub,j}$ represent the box (bound) constraints on the decision variables. The matrices $A_{x,j}$, $A_{z,j}$, $H_{x,j}$, and $H_{z,j}$ and the vectors $b_j$ and $g_j$ are associated with the inequality constraints and the equality constraints for the jth subplant.

In some embodiments, subplant models 936 store the input data used to generate the subplant constraints. Such input data may include sampled data points of the high level subplant curve/operational domain. For example, for chiller subplant 422, this data may include several points sampled from a subplant curve. When implemented as part of an online operational tool (shown in FIG. 6), the high level subplant operational domain can be sampled by querying low level optimizer 634 at several requested production amounts. When implemented as part of an offline planning tool (shown in FIG. 7), the sampled data may be user-specified efficiency and capacity data.

Storage Models

Referring again to FIG. 9, element models 930 are shown to include storage models 938. Storage models 938 may store models for each of storage 430. Storage models 938 can define the types of resources stored by each of storage 430, as well as storage constraints that limit the state-of-charge (e.g., maximum charge level) and/or the rates at which each storage 430 can be charged or discharged. In some embodiments, the current level or capacity of storage 430 is quantified by the state-of-charge (SOC), which can be denoted by ϕ where ϕ=0 corresponds to empty and ϕ=1 corresponds to full. To describe the SOC as a function of the charge rate or discharge rate, a dynamic model can be stored as part of storage models 938. The dynamic model may have the form:

$$\phi(k+1) = A\phi(k) + Bu(k)$$

where ϕ(k) is the predicted state of charge at time step k of the optimization period, u(k) is the charge/discharge rate at time step k, and A and B are coefficients that account for dissipation of energy from storage 430. In some embodiments, A and B are time-varying coefficients. Accordingly, the dynamic model may have the form:

$$\phi(k+1) = A(k)\phi(k) + B(k)u(k)$$

where A(k) and B(k) are coefficients that vary as a function of the time step k.

Asset allocator 402 can be configured to add constraints based on the operational domain of storage 430. In some embodiments, the constraints link decision variables adjacent in time as defined by the dynamic model. For example, the constraints may link the decision variables ϕ(k+1) at time step k+1 to the decision variables ϕ(k) and u(k) at time step k. In some embodiments, the constraints link the SOC of storage 430 to the charge/discharge rate. Some or all of these constraints may be defined by the dynamic model and may depend on the operational domain of storage 430.

In some embodiments, storage models 938 store optimization constraints for each of storage 430. Storage constraints may be written in the following general form:

$$A_{x,k}x_k + A_{z,k}z_k \leq b_k$$

$$H_{x,k}x_k + H_{z,k}z_k = g_k$$

$$x_{lb,k} \leq x_k \leq x_{ub,k}$$

$$z_{lb,k} \leq z_k \leq z_{ub,k}$$

$$z_k = \text{integer}$$

for all k where k is an index representing the kth storage device, $x_k$ denotes the continuous variables associated with the kth storage device (e.g., resource variables and auxiliary optimization variables), and $z_k$ denotes the integer variables associated with the kth storage device (e.g., auxiliary binary optimization variables). The vectors $x_{lb,k}$, $x_{ub,k}$, $z_{ib,k}$, and $z_{ub,k}$ represent the box (bound) constraints on the decision variables. The matrices $A_{x,k}$, $A_{z,k}$, $H_{x,k}$, and $H_{z,k}$ and the vectors $b_k$ and $g_k$ are associated with the inequality constraints and the equality constraints for the kth storage device.

The optimization constraints may ensure that the predicted SOC for each of storage 430 is maintained between a minimum SOC $Q_{min}$ and a maximum SOC $Q_{max}$. The optimization constraints may also ensure that the charge/discharge rate is maintained between a minimum charge rate $\dot{Q}_{min}$ and maximum charge rate $\dot{Q}_{max}$. In some embodiments, the optimization constraints include terminal constraints imposed on the SOC at the end of the optimization period. For example, the optimization constraints can ensure that one or more of storage 430 are full at the end of the optimization period (i.e., "tank forced full" constraints).

Element Links

Still referring to FIG. 9, element models 930 are shown to include element links 940. In some embodiments, element links 940 define the connections between sources 410, subplants 420, storage 430, and sinks 440. These links 940 are shown as lines connecting various elements in plant resource diagrams 500 and 550. For example, element links 940 may define which of sources 410 provide resources to each of subplants 420, which subplants 420 are connected to which storage 430, and which subplants 420 and/or storage 430 provide resources to each of sinks 440. Element links 940 may contain the data and methods needed to create and solve an instance of the high level optimization problem.

In some embodiments, element links 940 link sources 410, subplants 420, storage 430, and sinks 440 (i.e., the high level problem elements) using a netlist of connections between high level problem elements. The information provided by element links 940 may allow multiple subplants 420, storage 430, sinks 440, and sources of the same type to be defined. Rather than assuming that all elements contribute to and draw from a common pool of each resource, element links 940 can be used to specify the particular connections between elements. Accordingly, multiple resources of the same type can be defined such that a first subset of subplants 420 produce a first resource of a given type (e.g., Chilled Water A), whereas a second subset of subplants 420 produce a second resource of the same type (e.g., Chilled Water B). Such a configuration is shown in FIG. 5B. Advantageously, element links 940 can be used to build constraints that reflect the actual physical connections between equipment in a central plant.

In some embodiments, element links 940 are used to account for the distribution costs of resources between elements of asset allocation system 400 (e.g., from sources 410 to subplants 420, from subplants 420 to sinks 440, etc.) and/or the distribution efficiency of each connection. In some cases it may be necessary to include costs for delivering the resource along a connection, or an efficiency of the transportation (amount or percentage of resources received on the other side of the connection). Accounting for distribution costs and/or distribution efficiency may affect the result of the optimization in some situations. For example, consider a first chiller subplant 420 that is highly efficient and can provide a chilled water resource to sinks 440, but it costs significantly more (e.g., due to pumping costs etc.) to transport the resource from the first chiller subplant 420 rather than from a second chiller subplant 420. In that scenario, asset allocator 402 may determine that the first chiller subplant 420 should be used only if necessary. Additionally, energy could be lost during transportation along a particular connection (e.g., chilled water temperature may increase over a long pipe). This could be described as an efficiency of the connection.

The resource balance constraint can be modified to account for distribution efficiency as follows:

$$\sum_{sources} \alpha_{source,resource} \text{purchase}_{resource,time} + \sum_{subplants} \alpha_{subplant,resource} \text{produces}(x_{internal,time}, x_{external,time}, v_{uncontrolled,time}) - \sum_{subplants} \frac{1}{\alpha_{source,resource}} \text{consumes}(x_{internal,time}\, x_{external,time}, v_{uncontrolled,time}) + \sum_{storages} \text{discharges}_{resource}(x_{internal,time}, x_{external,time}) - \frac{1}{\alpha_{sink,resource}} \sum_{sinks} \text{requests}_{resource} = 0 \quad \forall \text{ resources}, \forall \text{ time} \in \text{horizon}$$

where the α terms are loss factors with values between zero and one.

The cost function can be modified to account for transportation costs as follows:

$$J(x) = \sum_{sources} \sum_{horizon} \text{cost}(\text{purchase}_{resource,time}, \text{time}) + \ldots + \sum_{connection} \lambda_{connection} \text{resource}_{connection}$$

where $\lambda_{connection}$ is the cost per unit resource transported along a particular connection and $\text{resource}_{connection}$ is the amount of the resource transported along the connection. Accordingly, the final term of the cost function accounts for transportation costs along each of the connections or links between elements in asset allocation system 400.

Demand Charges

Still referring to FIG. 9, asset allocator 402 is shown to include a demand charge module 906. Demand charge module 906 can be configured to modify the cost function J (x) and the optimization constraints to account for one or more demand charges. As previously described, demand charges are costs imposed by sources 410 based on the peak consumption of a resource from sources 410 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from 410 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 906 may be configured to account for demand charges in the high level optimization process performed by asset allocator 402. In some embodiments, demand charge module 906 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

The demand charge term of the cost function J(x) can be expressed as:

$$J(x) = \ldots \sum_{s \in sources} \sum_{q \in demands_s} w_{demand,s,q} r_{demand,s,q} \max_{i \in demand_{s,q}} (\text{purchase}_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 906 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demands_{s,q}} (g_{s,q,i} \text{purchase}_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q} = [0, 0, 0, 1, 1, 1, 1, 0, 0, 0, 1, 1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ Vi=1, 2, 3, 8, 9, 10) and active during time steps i=4, 5, 6, 7, 11, 12 (i.e., $g_{s,q,i}=1$ $\forall$i=4, 5, 6, 7, 11, 12). Accordingly, the term $g_{s,q,i}$ purchase$_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 906 calculates the weighting factor $w_{demand,s,\ q}$ for each demand charge q in the cost function J(x). The weighting factor $w_{demand,s,\ q}$ may be a ratio of the number of time steps the corresponding demand charge q is active during the optimization period to the number of time steps the corresponding demand charge q is active in the remaining demand charge period (if any) after the end of the optimization period. For example, demand charge module 906 can calculate the weighting factor $w_{demand,s,\ q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period).

The following example illustrates how demand charge module 906 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 906 can modify the cost function J (x) to account for the N demand charges as shown in the following equation:

$$J(x) = \ldots + w_{d_1} r_{d_1} \max_i (g_{1_i}(-P_{bat_i} + eLoad_i)) + \ldots +$$
$$w_{d_q} r_{d_q} \max_i (g_{q_i}(-P_{bat_i} + eLoad_i)) + \ldots + w_{d_N} r_{d_N} \max_i (g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., $/kW) and the weighting factor $w_{d_q}$ indicates the weight applied to the qth demand charge.

Demand charge module 906 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 906 linearizes the demand charge terms of the cost function J(x) by introducing an auxiliary variable $d_q$ for each demand charge q. In the case of the previous example, this will result in N auxiliary variables $d_1$ . . . $d_N$ being introduced as decision variables in the cost function J(x). Demand charge module 906 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 906 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall\, i = k \ldots k+h-1,\, g_{1_i} \neq 0$$
$$d_1 \geq 0 \quad \vdots$$
$$d_q \geq g_{q_i}(-P_{bat_i} + eLoad_i) \quad \forall\, i = k \ldots\ k+h-1,\, g_{q_i} \neq 0$$
$$d_q \geq 0 \quad \vdots$$
$$d_N \geq g_{N_i}(-P_{bat_i} + eLoad_i) \quad \forall\, i = k \ldots\ k+h-1,\, g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 906 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 906 can constrain each auxiliary demand charge variable to be greater than or equal to the maximum electricity purchase during the hours the corresponding demand charge is active, using the inequality constraints described above.

Demand charge module 906 can generate a demand charge mask $g_q$ for each of the three demand charges (i.e., q=1 . . . 3), where g, includes an element for each time step of the optimization period (i.e., $g_q=[g_{q_1} \ldots g_{q_{24}}]$). The three demand charge masks can be defined as follows:

$$g_{1_i} = 1 \quad \forall\, i = 1 \ldots 24$$
$$g_{2_i} = 1 \quad \forall\, i = 12 \ldots 18$$
$$g_{3_i} = 1 \quad \forall\, i = 9 \ldots 12,\, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 906 considers several different demand charge structures when incorporating multiple demand charges into the cost function J (x) and optimization constraints. Demand charge structures can vary from one utility to another, or the utility may offer several demand charge options. In order to incorporate the multiple demand charges within the optimization framework, a generally-applicable framework can be defined as previously described. Demand charge module 906 can translate any demand charge structure into this framework. For example, demand charge module 906 can characterize each demand charge by rates, demand charge period start, demand charge period end, and active hours. Advantageously, this allows demand charge module 906 to incorporate multiple demand charges in a generally-applicable format.

The following is another example of how demand charge module 906 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 906 can implement the applicable demand charges using the hoursActive mask, the relevant period, and the corresponding rate.

In the case of an annual demand charge, demand charge module 906 can set the demand charge period start and period end to the beginning and end of a year. For the annual demand charge, demand charge module 906 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 906 can represent the demand charge as an annual demand charge. Demand charge module 906 can set the demand charge period start and end to the beginning and end of a year. Demand charge module 906 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 906 can translate the demand charge structure into a monthly demand charge and an annual demand charge. The rate of the monthly demand charge may be half of the given monthly rate and the annual rate may be the sum of given monthly rates divided by two. These and other features of demand charge module 906 are described in greater detail in U.S. patent application Ser. No. 15/405,236 filed Jan. 12, 2017, the entire disclosure of which is incorporated by reference herein.

Incentive Programs

Referring again to FIG. 9, asset allocator 402 is shown to include an incentive program module 908. Incentive program module 908 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, asset allocation system 400 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, asset allocation system 400 may reduce its demand for resources from a utility as part of a load shedding program. It is contemplated that asset allocation system 400 may participate in any number and/or type of IBDR programs.

In some embodiments, incentive program module 908 modifies the cost function (x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 908 can modify the cost function J(x) to include the following term:

$$\min_{b_i, P_{bat_i}}\left(-\sum_{i=k}^{k+h-1} b_i r_{ELDR_i}\left(adjCBL_i - \left(eLoad_i - P_{bat_i}\right)\right)\right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}}\left(-\sum_{i=k}^{k+h-1} b_i r_{ELDR_i}\left(\sum_{l=1}^{4}\frac{e_{li}}{4} + \sum_{p=m-4}^{m-2}\frac{1}{3}\left(eLoad_p - P_{bat_p} - \sum_{l=1}^{4}\frac{e_{lp}}{4}\right) - \left(eLoad_i - P_{bat_i}\right)\right)\right)$$

where $e_{li}$ and $e_{lp}$ are the electric loads at the lth hour of the operating day.

In some embodiments, incentive program module 908 handles the integration of ELDR into the optimization problem as a bilinear problem with two multiplicative decision variables. In order to linearize the cost function J (x) and customize the ELDR problem to the optimization framework, several assumptions may be made. For example, incentive program module 908 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 908 calculates the participation vector $b_i$ as follows:

$$b_i = \begin{cases} 1 & \forall\, i/r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 908 to determine when to participate in ELDR, incentive program module 908 can adjust the cost function J (x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i}\left(\sum_{p=m-4}^{m-2} -\frac{1}{3} P_{bat_p} + P_{bat_i}\right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

To build the high level optimization problem, optimization problem constructor 910 may query the number of decision variables and constraints that each subplant 420, source 410, storage 430, and site specific constraint adds to the problem. In some embodiments, optimization problem constructor 910 creates optimization variable objects for each variable of the high level problem to help manage the flow of data. After the variable objects are created, optimization problem constructor 910 may pre-allocate the optimization matrices and vectors for the problem. Element links 940 can then be used to fill in the optimization matrices and vectors by querying each component. The constraints associated with each subplant 420 can be filled into the larger problem-wide optimization matrix and vector. Storage constraints can be added, along with demand constraints, demand charges, load balance constraints, and site-specific constraints.

Extrinsic Variables

In some embodiments, asset allocator 402 is configured to optimize the use of extrinsic variables. Extrinsic variables can include controlled or uncontrolled variables that affect multiple subplants 420 (e.g., condenser water temperature, external conditions such as outside air temperature, etc.). In some embodiments, extrinsic variables affect the operational domain of multiple subplants 420. There are many methods that can be used to optimize the use of extrinsic variables. For example, consider a chiller subplant connected to a cooling tower subplant. The cooling tower subplant provides cooling for condenser water provided as an input to the chiller. Several scenarios outlining the use of extrinsic variables in this example are described below.

In a first scenario, both the chiller subplant and the tower subplant have operational domains that are not dependent on the condenser water temperatures. In this scenario, the condenser water temperature can be ignored (e.g., excluded from the set of optimization variables) since the neither of the operational domains are a function of the condenser water temperature.

In a second scenario, the chiller subplant has an operational domain that varies with the entering condenser water temperature. However, the cooling tower subplant has an operational domain that is not a function of the condenser water temperature. For example, the cooling tower subplant may have an operational domain that defines a relationship between fan power and water usage, independent from its leaving condenser water temperature or ambient air wet bulb temperature. In this case, the operational domain of the chiller subplant can be sliced (e.g., a cross section of the operational domain can be taken) at the condenser water temperature indicated at each point in the optimization period.

In a third scenario, the cooling tower subplant has an operational domain that depends on its leaving condenser water temperature. Both the entering condenser water temperature of the chiller subplant and the leaving condenser water temperature of the cooling tower subplant can be specified so the operational domain will be sliced at those particular values. In both the second scenario and the third scenario, asset allocator 402 may produce variables for the condenser water temperature. In the third scenario, asset allocator 402 may produce the variables for both the tower subplant and the chiller subplant. However, these variables will not become decision variables because they are simply specified directly In a fourth scenario, the condenser water temperature affects the operational domains of both the cooling tower subplant and the chiller subplant. Because the condenser water temperature is not specified, it may become an optimization variable that can be optimized by asset allocator 402. In this scenario, the optimization variable is produced when the first subplant (i.e., either the chiller subplant or the cooling tower subplant) reports its optimization size. When the second subplant is queried, no additional variable is produced. Instead, asset allocator 402 may recognize the shared optimization variable as the same variable from the connection netlist.

When asset allocator 402 asks for constraints from the individual subplants 420, subplants 420 may send those constraints using local indexing. Asset allocator 402 may then disperse these constraints by making new rows in the optimization matrix, but also distributing the column to the correct columns based on its own indexing for the entire optimization problem. In this way, extrinsic variables such as condenser water temperature can be incorporated into the optimization problem in an efficient and optimal manner.

Commissioned Constraints

Some constraints may arise due to mechanical problems after the energy facility has been built. These constraints are site specific and may not be incorporated into the main code for any of the subplants or the high level problem itself. Instead, constraints may be added without software update on site during the commissioning phase of the project. Furthermore, if these additional constraints are known prior to the plant build they could be added to the design tool run. Commissioned constraints can be held by asset allocator 402 and can be added constraints to any of the ports or connections of subplants 420. Constraints can be added for the consumption, production, or extrinsic variables of a subplant.

As an example implementation, two new complex type internals can be added to the problem. These internals can store an array of constraint objects that include a dictionary to describe inequality and equality constraints, times during which the constraints are active, and the elements of the horizon the constraints affect. In some embodiments, the dictionaries have keys containing strings such as (subplantUserName).(portInternalName) and values that represent the linear portion of the constraint for that element of the constraint matrix. A special "port name" could exist to reference whether the subplant is running. A special key can be used to specify the constant part of the constraint or the right hand side. A single dictionary can describe a single linear constraint.

Operational Domains

Referring now to FIG. 9, asset allocator 402 is shown to include an operational domain module 904. Operational domain module 904 can be configured to generate and store operational domains for various elements of the high level optimization problem. For example, operational domain module 904 can create and store operational domains for one or more of sources 410, subplants 420, storage 430, and/or sinks 440. The operational domains for subplants 420 may describe the relationship between the resources, intrinsic variables, and extrinsic variables, and constraints for the rate of change variables (delta load variables). The operational domains for sources 410 may include the constraints necessary to impose any progressive/regressive rates (other than demand charges). The operational domain for storage 430 may include the bounds on the state of charge, bounds on the rate of charge/discharge, and any mixed constraints.

In some embodiments, the operational domain is the fundamental building block used by asset allocator 402 to describe the models (e.g., optimization constraints) of each high level element. The operational domain may describe the admissible values of variables (e.g., the inputs and the outputs of the model) as well as the relationships between variables. Mathematically, the operational domain is a union of a collection of polytopes in an n-dimensional real space. Thus, the variables must take values in one of the polytopes of the operational domain. The operational domains generated by operational domain module 904 can be used to define and impose constraints on the high level optimization problem.

Example Plant Systems

Figure 10A:
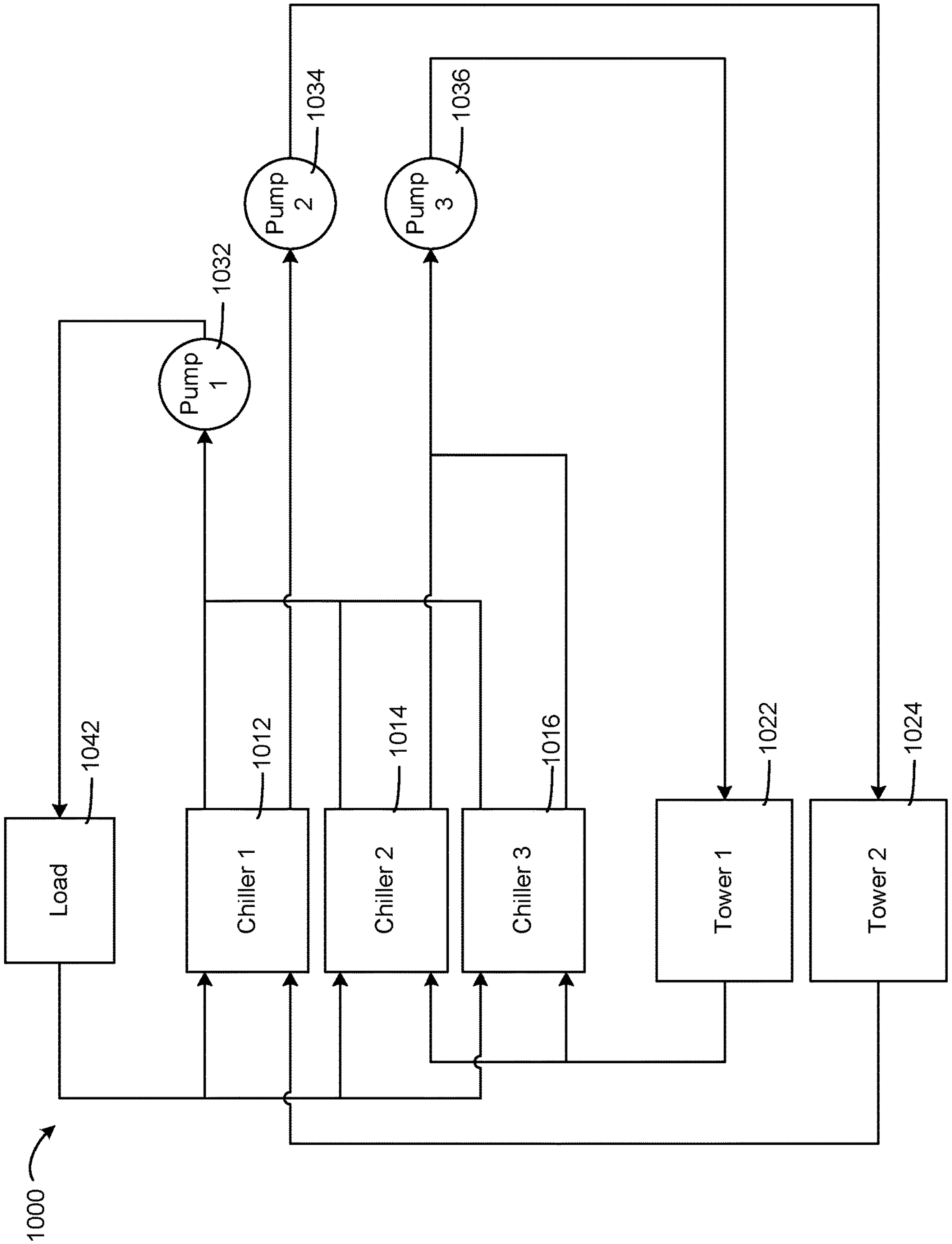
FIG. 10A is a block diagram illustrating a physical layout of a simple chiller plant that can be broken down for an automatic EMPC formulation process, according to an exemplary embodiment.

Referring now to FIG. 10A, a simple chiller plant diagram 1000 that can be automatically broken down for optimal EMPC problem formulation is shown, according to an exemplary embodiment. It is important to note that automatic EMPC problem formulation can be applied to a variety of central plants such as central plant 200 which can include a variety of different equipment operated by a control system. EMPC problem formulation can also be applied to any other control systems such as chiller subplant 422. Chiller plant diagram 1000 is shown to include chiller units 1012, 1014, and 1016, cooling towers 1022 and 1024, water pumps 1032, 1034, and 1036, and energy load 1042. Chiller plant diagram 1000 is an example of a model that may be used as an input for the EMPC problem formulation process. In some embodiments, optimization problem constructor 910 is configured to analyze the interconnections between equipment in the input model and break the input model down into systems of unique connections. This functionality is described in greater detail below with reference to FIG. 11B.

The input model used in the EMPC problem formulation process can be created in a variety of ways. For example, a diagram of a central plant (e.g., similar to diagrams 500 and 550) can be created through a user interface such as interface 724. Users may drag symbols representing various types of sources 410, subplants 420, storage 430, and sinks 440 onto a workspace and form various connection therebetween. Users can also define the input model in a spreadsheet or other type of document. Asset allocator 402 can then analyze the input model in order to generate a net list as described in more detail below.

Figure 10B:
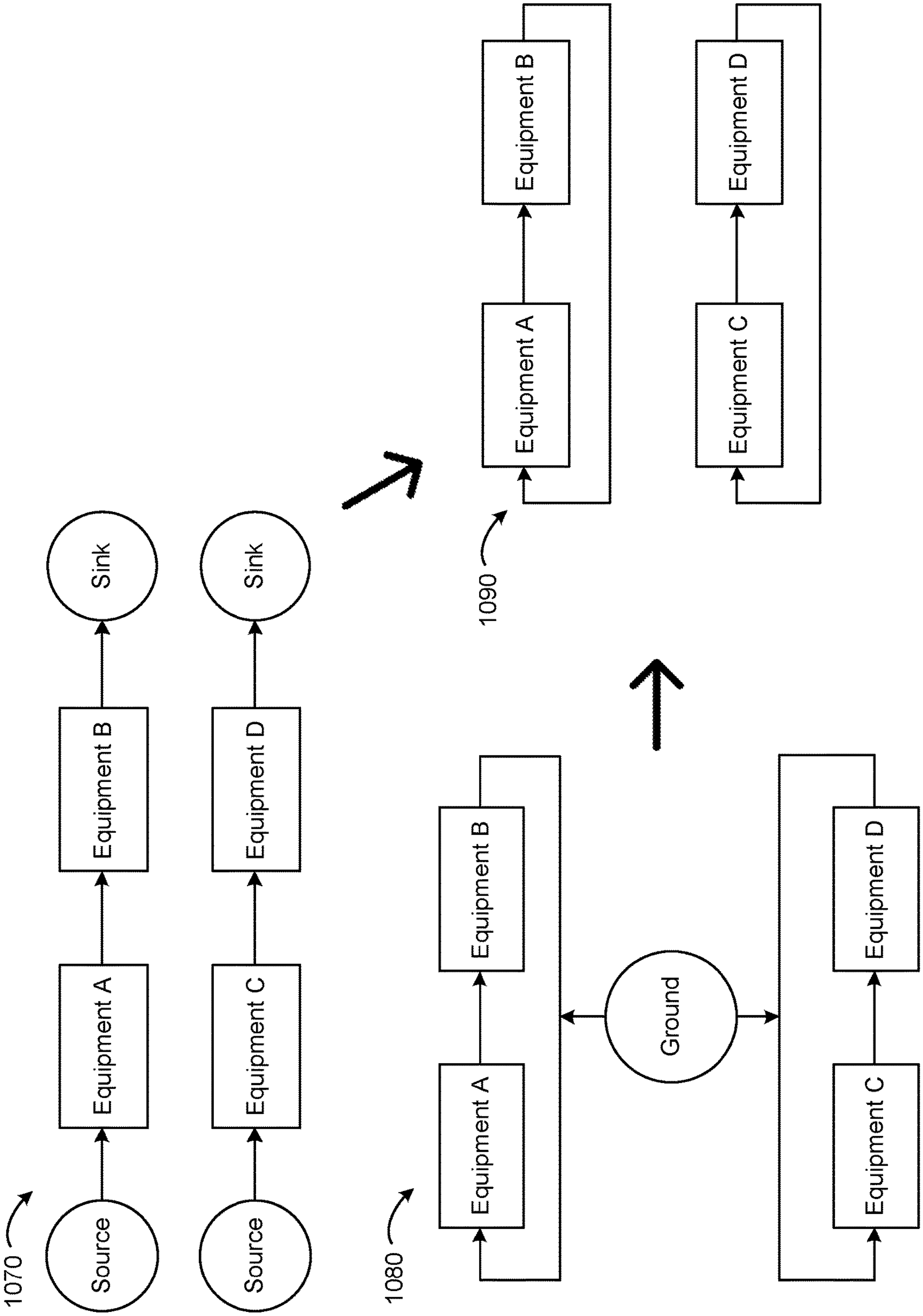
FIG. 10B is a block diagram illustrating source, sink, and ground connections that can be removed as part of a process of breaking down an input diagram, according to an exemplary embodiment.

Referring now to FIG. 10B, examples of source, sink, and ground connections that can be removed as part of the process of breaking down an input model is shown. There are no source, sink, or ground connections shown in input diagram 1000 for simplicity. However, it should be noted that there can be any number of these connections present an input model. System 1070 is shown to include sources and sinks interconnected with equipment in a central plant. A source may be any of sources 410 and a sink may be any of sinks 440. System 1080 is shown to include a ground connection between equipment in a central plant. A ground may be used in the input model at any location that serves a reference point for a measurement. For example, a control signal being sent to a chiller can be measured with respect to a ground reference point. The result of removing sources and sinks from system 1070 and grounds from system 1080 is shown by system 1090. Optimization problem constructor 910 can be configured to remove sources, sinks, and grounds from an input model in order to automatically formulate the EMPC problem.

Figure 10C:
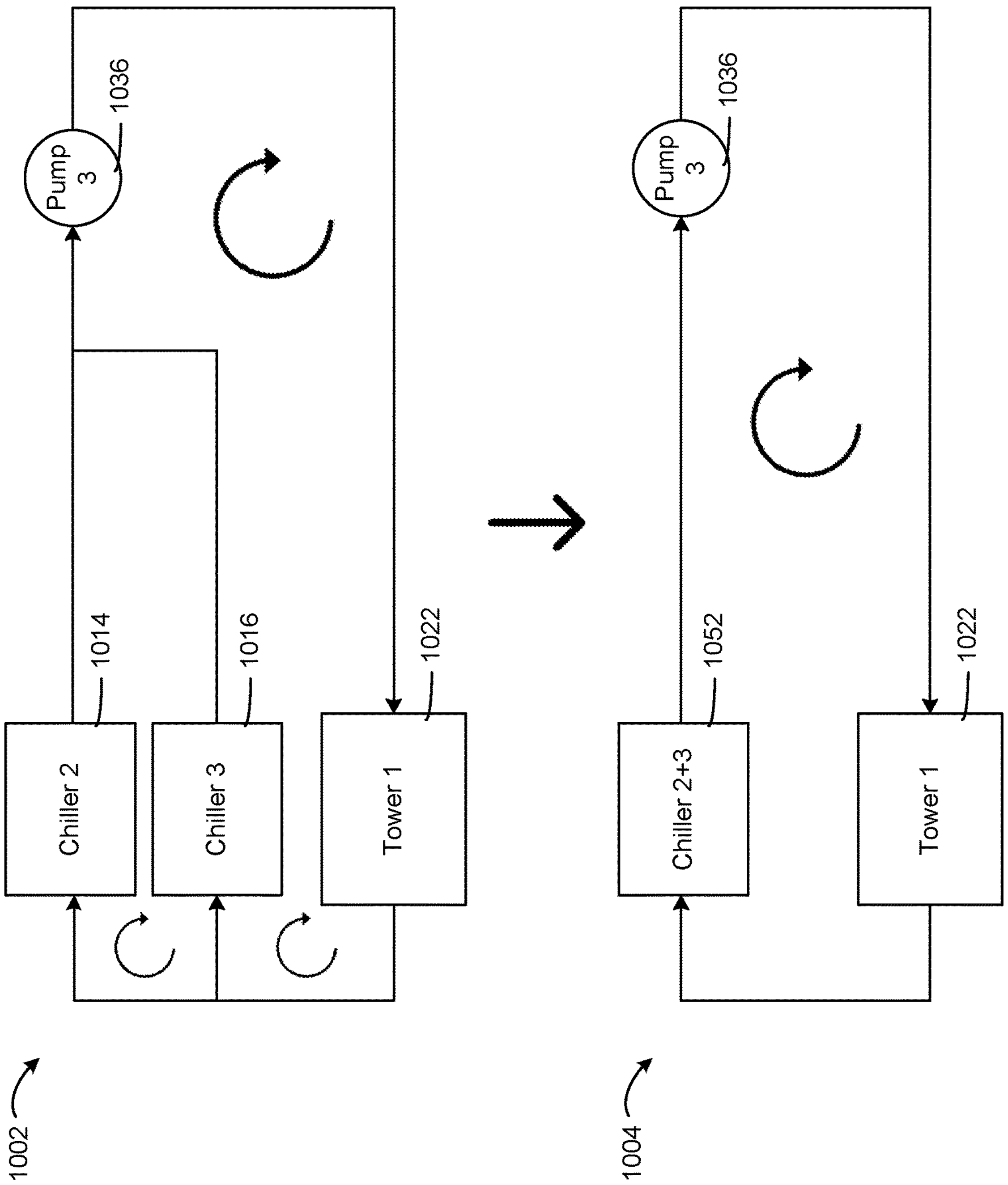
FIG. 10C is a block diagram illustrating how the input diagram of FIG. 10A can be broken down into systems with parallel equipment grouped together, according to an exemplary embodiment.

Referring now to FIG. 10C, a system 1002 that can be found within chiller plant diagram 1000 is shown, according to an exemplary embodiment. System 1002 includes chillers 1014 and 1016, tower 1022, and pump 1036. For some background, graph theory can be defined as the study of mathematical structures used to create models of pairwise relationships among objects. A graph consists of a set of interconnected vertices and a cycle is a path of edges and vertices wherein a vertex can be reached from itself. System 1002 can be treated as a graph with directed connections and multiple vertices that may contain any number of cycles. Optimization problem constructor 910 can be configured to analyze system 1002 and discover any and all cycles that may present. More detail about how cycles are discovered is described below with reference to FIG. 11C. In the case of system 1002, three cycles are present (roughly shown by circular arrows in FIG. 10B) with the first consisting of only chillers 1014 and 1016. The second cycle consists of chiller 1016, pump 1036, and tower 1022. The third cycle consists of chiller 1014, pump 1036, and tower 1022.

Optimization problem constructor 910 may be configured to analyze these cycles and determine that the two chillers in system 1002 may be connected in a parallel grouping 1052 to form a grouped system 1004. In some embodiments, optimization problem constructor 910 determines that two or more devices are arranged in a parallel grouping in response to determining that the two or more devices are the only difference between two or more cycles. In other words, optimization problem constructor 910 may determine that a first device and a second device are arranged in a parallel grouping if a first cycle containing the first device can be transformed to a second cycle containing the second device by merely swapping the second device for the first device in the first cycle. For example, the second cycle shown in FIG. 10B (i.e., the cycle consisting of chiller 1016, pump 1036, and tower 1022) can be transformed into the third cycle shown in FIG. 10B (i.e., the cycle consisting of chiller 1014, pump 1036, and tower 1022) by swapping chiller 1014 for chiller 1016. Accordingly, optimization problem constructor 910 may determine that chiller 1014 and chiller 1016 are arranged in parallel in system 1002. Optimization problem constructor 910 may be configured to merge as much of the equipment contained in an input model (e.g., input diagram 1000) into groups as possible in order to formulate an optimal EMPC problem.

Figure 10D:
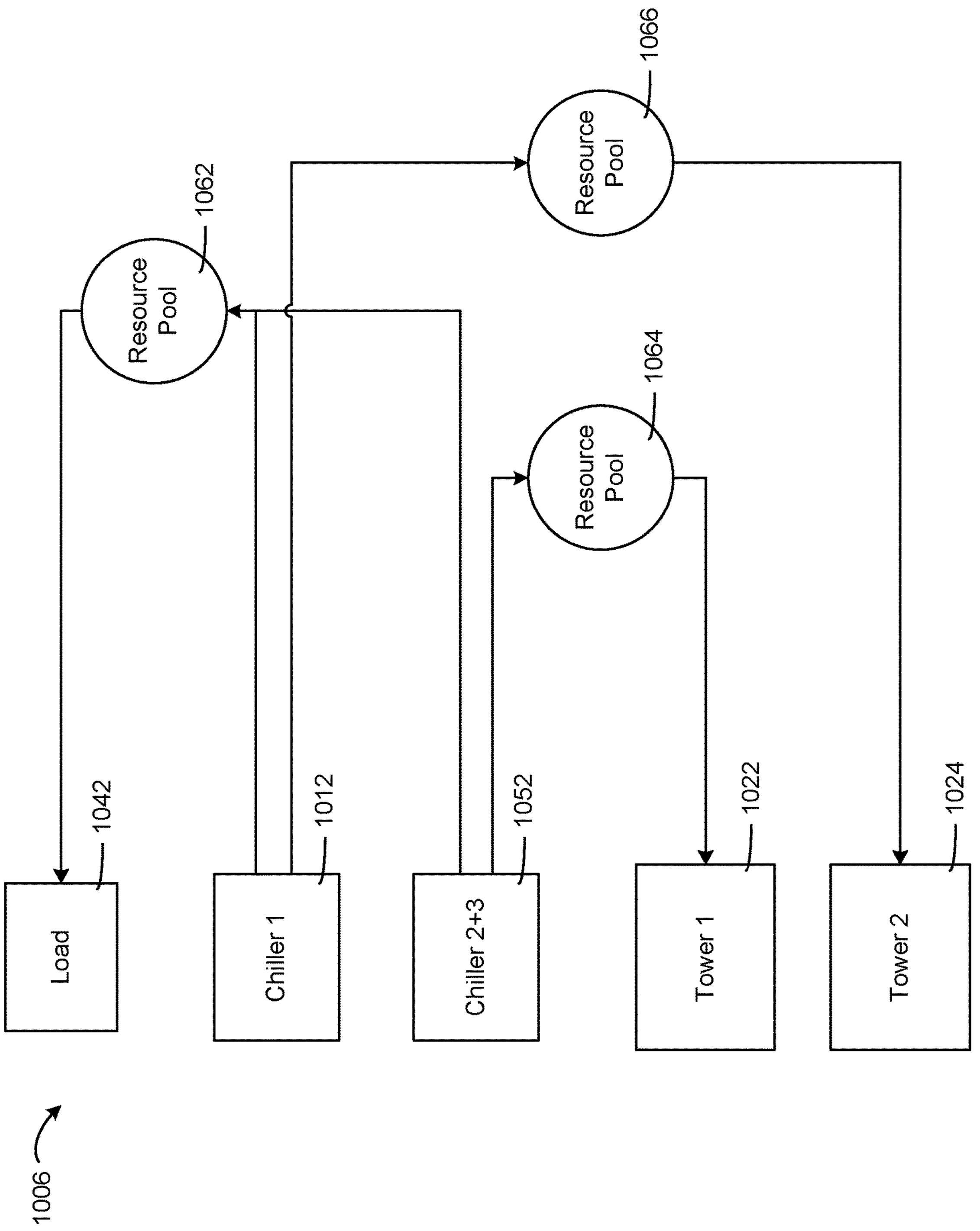
FIG. 10D is a block diagram illustrating the system of FIG. 10A when broken down into optimal groups for formulation of the EMPC problem, according to an exemplary embodiment.

Referring now to FIG. 10D, an EMPC problem layout 1006 is shown, according to an exemplary embodiment. Optimization problem constructor 910 can be configured to minimize the number of variables to solve by maximizing the size of the groups in the EMPC problem. For example, resource pool 1062 uses the grouping of two chillers to simplify the problem. It is important to note, however, that groups cannot be formed in a manner that will prevent correct decisions from being made. For example, the two towers shown in problem layout 1006 are not plumbed together so they are shown connected to two independent resource pools 1064 and 1066.

Automatic EMPC Formulation Method

Figure 11A:
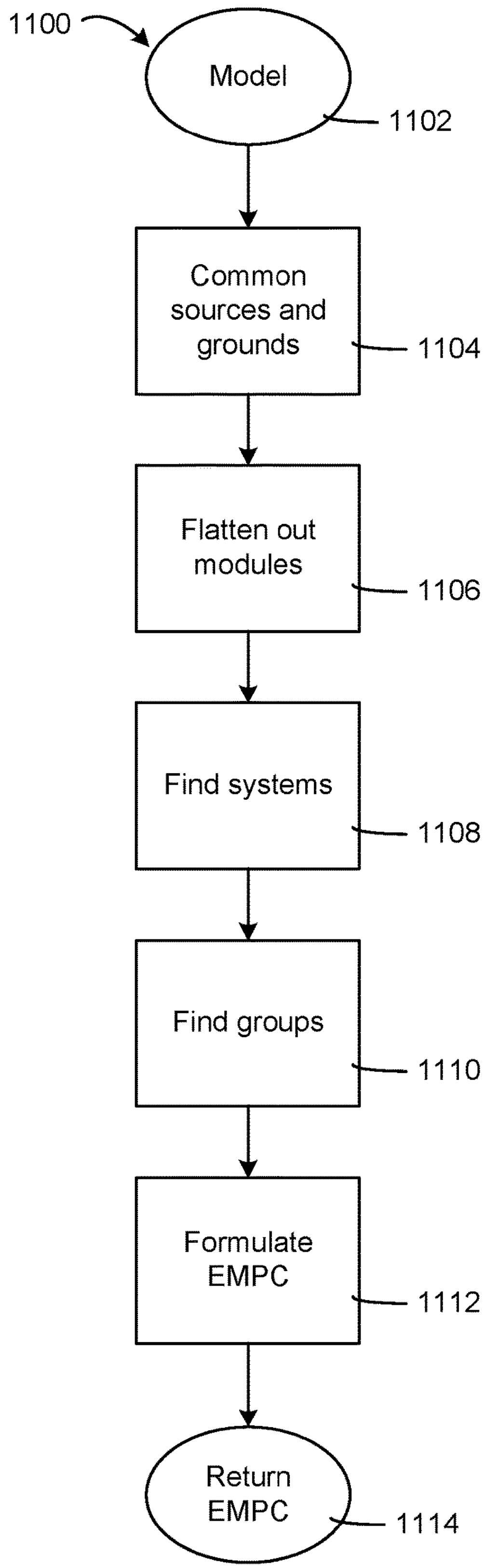
FIG. 11A is a flow diagram illustrating an overall method of formulating an EMPC problem from an input diagram, according to an exemplary embodiment.

Referring now to FIGS. 11A-11D, flow diagrams illustrating a method for automatic formulation of an economic model predictive control problem are shown, according to exemplary embodiments. Referring particularly to FIG. 11A, a flow diagram 1100 showing the overall EMPC problem formulation method is shown. This method can be performed by components such as asset allocator 402, which can be part of planning tool 700 or central plant controller 600 and can include optimization problem constructor 910. The process begins with a model as an input at step 1102. The input model, as mentioned above, may be a diagram that contains the physical layout of all equipment in a central plant such as plant 200 or any other equipment model of interest. The model may contain the layout which includes all of the connection pairs present in the diagram. A connection pair can be a pair of numbers used to reference an internal connection between equipment. For example, a connection between a chiller (such as chiller 1012) and a pump (such as pump 1032) may form the connection pair [1,2]. All of the connection pairs may be stored in a net list. The net list may identify all of the equipment in the plant and may define connections between pairs of equipment. The net list can be used to ultimately formulate the EMPC problem.

Flow diagram 1100 is shown to include connecting all common sources and grounds in the input model (block 1104). A source may be any of sources 410 or any other location from which equipment in the input model draws resources from. The input model may include different sets of equipment that draw resources from the same source (i.e., a common source). The EMPC problem becomes simpler to formulate when common sources are connected in the input model. As mentioned above, a ground may be used in the input model at any location that serves a reference point for a measurement. The EMPC problem becomes simpler to formulate when all ground points are connected (i.e., a common ground). Optimization problem constructor 910 can be configured to connect all common sources and grounds in the input model.

Flow diagram 1100 is shown to include flattening out all modules in the input model (block 1106). The input model may consist of data stored in a variety of different modules. Each module may serve a specific purpose and may be configured to be interoperable with all other modules contained in the input model. For example, the input model may contain a module configured to provide a simple interface used to add a chiller (such as chiller 1012). The chiller may include multiple devices such as a condenser, an evaporator, a compressor, etc. Each module may be flattened out (i.e., broken apart into a set of interconnected devices) and the net list may be repaired in order to capture all of the connection pairs that may be needed to formulate the EMPC problem. Optimization problem constructor 910 can be configured to flatten out all of the modules contained in the input model.

Flow diagram 1100 is shown to include breaking down the input model into systems of unique connections (block 1108). Optimization problem constructor 910 can be configured to iterate through the net list and store systems of unique connections (such as system 1002) found from the input model in a hash table. Each system can then be further analyzed to form groups. More detail about how systems are discovered from the input diagram is presented below with reference to FIG. 11B.

Flow diagram 1100 is shown to include forming groups of equipment that can be used to make a decision on how to formulate the EMPC problem (block 1110). Optimization problem constructor 910 can be configured to analyze each system found in block 1108 and determine all cycles present within each system. Analyzing the cycles may allow optimization constructor 910 to discover equipment that can be grouped in parallel (such as parallel grouping 1052). The groups found in block 1110 can be used to formulate the EMPC problem. More detail about finding groups is presented below with reference to FIG. 11C.

Flow diagram 1100 is shown to include formulating the EMPC problem (block 1112). Optimization problem constructor 910 can be configured to formulate an EMPC problem based on the systems and groups determined in previous steps. The EMPC problem can ultimately be used to optimize a set of control decisions and minimize a cost function (x). More detail about formulating the EMPC problem is presented below with respect to FIG. 11D.

Figure 11B:
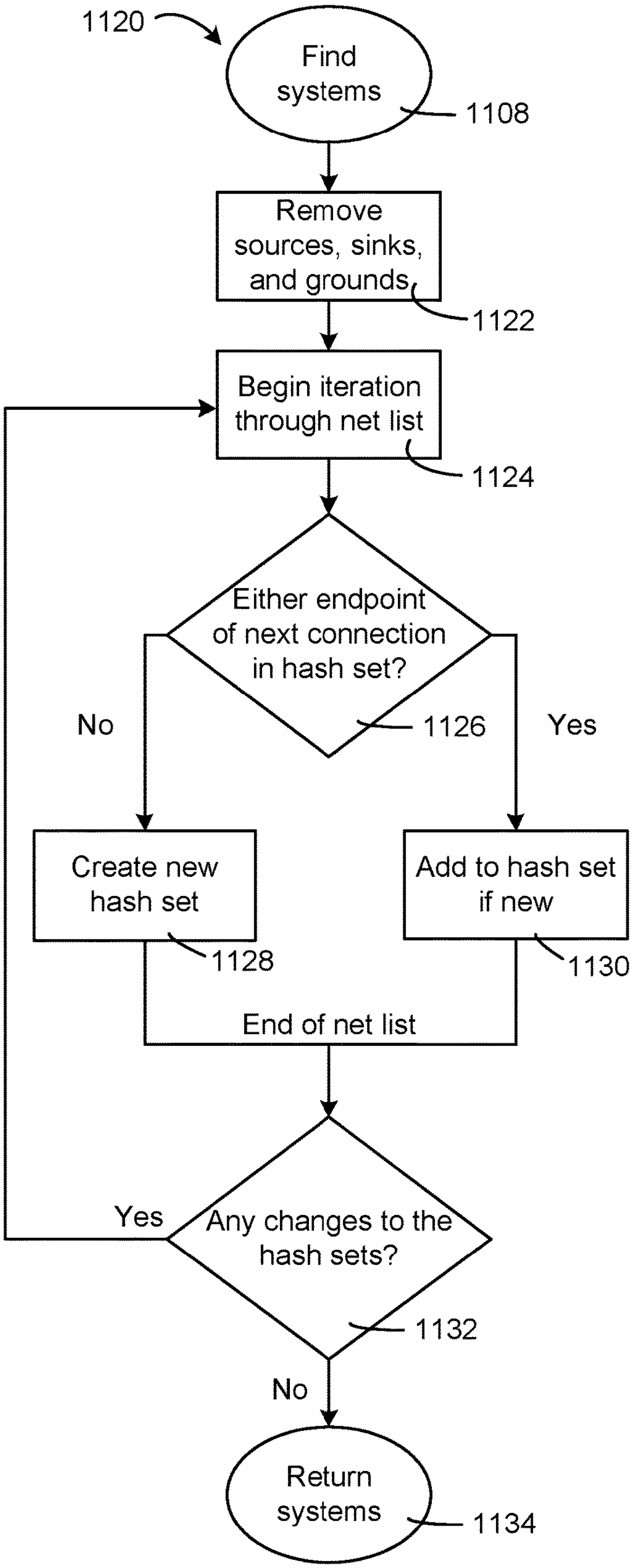
FIG. 11B is a flow diagram illustrating a method used to determine unique systems of connections from an input diagram, according to an exemplary embodiment.

Referring now to FIG. 11B, a flow diagram 1120 describing a method for finding systems (such as system 1002) from an input model (such as diagram 1000) is shown. The first step in this process can be to remove sources, sinks, and grounds (block 1122) as they will not contribute to finding the systems. As mentioned above, a ground can be any location in the input model that serves as a reference point for a measurement. Sources can be any of sources 410 and sinks can be any of sinks 440. Optimization problem constructor 910 can be configured to remove sources, sinks, and ground connections as well as iterate through each connection pair contained in the net list (block 1124).

Optimization problem constructor 910 may use a hash table to store sets of connection pairs that together form a system. A hash table consists of various buckets, or sets, that can be used to store information. Flow diagram 1120 is shown to include creating a new hash set (block 1128) to store the first connection pair as well as any connection pairs that together form a unique system. The connections stored in the hash table can grow while iterating through each connection pair present in the net list and storing each pair in a hash set (block 1130). The data stored in the hash table can be used to determine all of the systems from the input model. As an example, the hash table may contain one hash set that includes a list of connections [0,1], [1,2], and [0,3] and another hash set that includes the connection [4,5]. In this case, two systems may be returned: [4,5] and [0,1,2,3]. The system [0,1,2,3] can be formed since components 0, 1, 2, and 3 all connect eventually and thus form a system.

Flow diagram 1120 is shown to include decision block 1126 which describes how systems are determined when iterating through the net list. If hash set already contains either endpoint of the connection being examined, then the connection can be added to that hash set and iteration to the next connection in the net list can proceed. The connection pair may only be added to a hash set if it is not already contained in that hash set. If neither endpoint of the connection being examined is already contained in a hash set, then a new hash set can be created to store the connection pair. This process continues until each connection pair in the net list has been examined.

Flow diagram 1120 is shown to include a decision block 1132 that depicts the final step in determining when all systems have been found in the input graph. At the end of the first iteration through the net list the process may return to block 1124 and begin iterating through the net list a second time. Multiple iterations through the net list can be necessary to ensure that the order of pairs in the net list will not affect the systems returned in step 1108. For example, the second connection in the net list may have an internal connection with the eighth pair. In this case, when the second pair is being examined during the first iteration through the net list, the eighth connection pair will not be stored anywhere in the hash table yet. The final systems are not returned until an iteration through the entire net list results in no changes to the hash sets. The process shown in flow diagram 1120 ends at block 1134 when the final systems are returned. Optimization problem constructor 910 can be configured to find and return the systems present in the input model.

Table 1 is presented below in order to provide an example of how the process described in flow diagram 1120 is implemented.

TABLE 1

Example of Process 1120 Using Input Model 1000

| ID | From | To |
|---|---|---|
| 0 | Chiller 1, Chilled | Pump 1, Chilled |
| 1 | Chiller 2, Chilled | Pump 1, Chilled |
| 2 | Chiller 3, Chilled | Pump 1, Chilled |
| 3 | Pump 1, Chilled | Load, Chilled |
| 4 | Load, Chilled | Chiller 1, Chilled |
| 5 | Load, Chilled | Chiller 2, Chilled |
| 6 | Load, Chilled | Chiller 3, Chilled |
| 7 | Chiller 1, Condensed | Pump 2, Condensed |
| 8 | Pump 2, Condensed | Tower 2, Condensed |
| 9 | Tower 2, Condensed | Chiller 1, Condensed |
| 10 | Chiller 2, Condensed | Pump 3, Condensed |
| 11 | Chiller 3, Condensed | Pump 3, Condensed |
| 12 | Pump 3, Condensed | Tower 1, Condensed |
| 13 | Tower 1, Condensed | Chiller 2, Condensed |
| 14 | Tower 1, Condensed | Chiller 3, Condensed |

The fifteen connection pairs shown in table 1 together form the net list for input model 1000. The first step is to examine the first connection pair (ID0) and check the hash table to see if either connection is present in any of the hash sets. Since this is the first connection, a new hash set is created. The next step is to examine the second connection pair (ID1). The second connection pair shares the same Pump 1, Chilled connection endpoint as the first connection pair so it is added to the same hash set. The third connection pair shares the Pump 1, Chilled connection endpoint so the endpoint Chiller 3, Chilled can be added to the hash set as well. This pattern continues all the way through ID6. At this stage of the process, the first hash set contains endpoints of the first seven connection pairs: [Chiller 1, Chilled; Pump 1, Chilled; Chiller 2, Chilled; Chiller 3, Chilled; Load, Chilled].

Iteration through the net list continues with ID7 where for the first time neither endpoint of the connection is present in the first hash set. In this case, a new hash set is created that will contain endpoints from each of connection IDs 7-9. The resulting hash set contains [Chiller 1, Condensed; Pump 2, Condensed; Tower 2, Condensed]. None of the endpoints in connection IDs 10-14 exist in the first two hash sets so a third hash set is created to store [Chiller 2, Condensed; Pump 3, Condensed; Chiller 3, Condensed, Tower 1, Condensed].

At this stage of the process one full iteration through the net list has occurred and a second iteration through the net list begins starting back at ID0. Subsequent iterations through the net list are necessary to ensure the order the connection pairs are formed in the net list does not affect the final outcome. In the example shown in Table 1, a second iteration through the net list does not result in any changes to the three hash sets described above so process 1108 can return three systems: [Chiller 1, Chilled; Pump 1, Chilled; Chiller 2, Chilled; Chiller 3, Chilled; Load, Chilled], [Chiller 1, Condensed; Pump 2, Condensed; Tower 2, Condensed], and [Chiller 2, Condensed; Pump 3, Condensed; Chiller 3, Condensed, Tower 1, Condensed]. These three systems can be further analyzed in order to formulate the optimal EMPC problem.

Figure 11C:
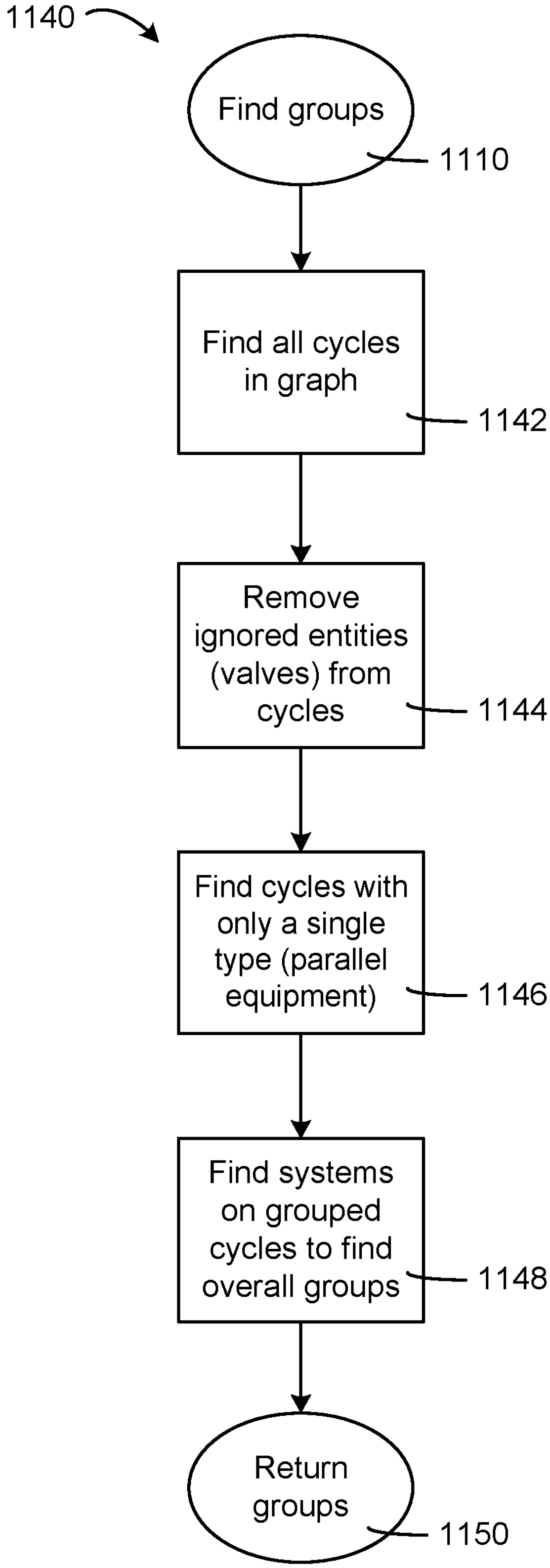
FIG. 11C is a flow diagram illustrating a method to connect equipment in parallel and create optimal groups for EMPC problem formulation, according to an exemplary embodiment.

Referring now to FIG. 11C, a flow diagram 1140 describing a method for finding groups from the previously determined systems is shown. The method begins at block 1142 where the systems returned in step 1108 can be analyzed using a graph theory cycle-finding algorithm to find all of the cycles present in each graph. As mentioned above, each system (such as system 1002) can be treated as a directed graph containing multiple vertices. A cycle is any path of vertices and directed connections from which a vertex can be reached from itself. As an example, optimization problem constructor 910 can be configured to analyze system 1002 and determine that three cycles are present.

Flow diagram 1140 is shown to include removing all ignored entities from the discovered cycles (block 1144). Ignored entities may include valves or any other equipment that does not contribute to the eventual formation of groups and the EMPC problem. Removing these entities can make the process of determining how to formulate the EMPC problem more simple and efficient. Optimization problem constructor 910 may be configured to remove all ignored entities from cycles found in block 1142.

Flow diagram 1140 is shown to include finding cycles with parallel equipment (block 1146). Grouping together parallel equipment can be very beneficial for formulating the EMPC problem in a manner that minimizes the cost function J(x) as much as possible. Optimization problem constructor 910 may be configured to create a parallel grouping whenever it finds a cycle containing only one type of equipment. For example, referring back to FIG. 10B, chillers 1014 and 1016 can be combined into a parallel grouping 1052. These chillers form a cycle consisting only of chiller equipment and thus may be connected into a parallel grouping.

Flow diagram 1140 is shown to include finding systems on grouped cycles in order to find the overall groups for an input model (block 1148). Once all of the systems are found from the input model (block 1108), cycles within those systems are found (block 1142), and equipment in those systems is grouped together (block 1146), then the overall groups for the input model can be found. The systems consisting of grouped equipment (such as grouped system 1004) may be referred to as the overall groups and can be returned as the last step before the EMPC problem is formulated (block 1150).

Figure 11D:
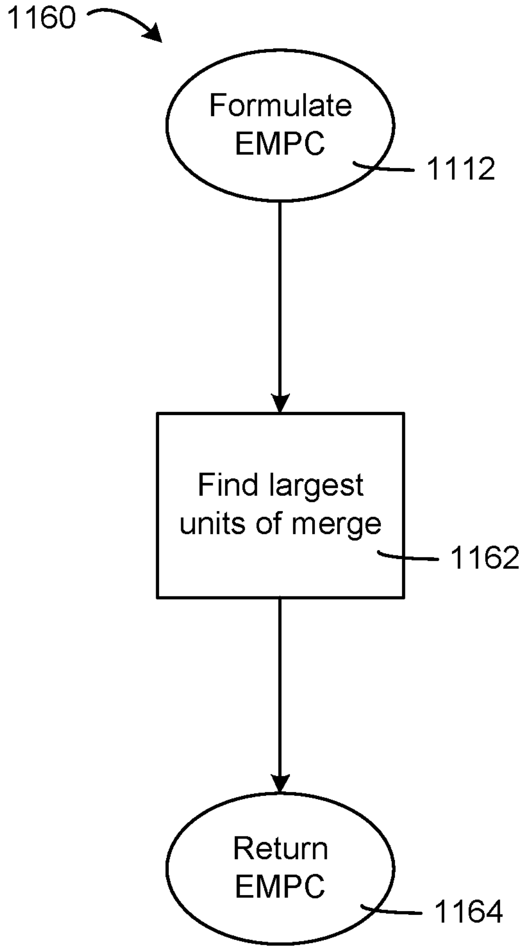
FIG. 11D is a flow diagram illustrating a method to formulate an optimal EMPC problem by maximizing the size of groups, according to an exemplary embodiment.

Referring now to FIG. 11D, a flow diagram 1160 describing a method for formulating the EMPC problem is shown. In order to minimize the number of variables that need to be solved in the EMPC problem, the size of the groups used when formulating the problem can be maximized (block 1162). As an example, resource pool 1062 uses the grouping of two chillers to simplify the problem. It is important to note groups cannot be formed in a manner that will prevent correct decisions from being made. For example, the two towers shown in problem layout 1006 are not plumbed together so they are shown connected to two independent resource pools 1054 and 1056. Optimization problem constructor 910 can be configured to maximize the size of the groups and to formulate the EMPC problem.

Flow diagram 1160 is shown to include returning the EMPC problem at the end of the process (block 1164). The EMPC problem can be used by components such as asset allocator 402 to optimize a set of control decisions. The EMPC problem may be subject to resource balances, operational domains, storage capacity constraints, peak usage constraints, or any other set of rules that may be necessary to achieve the goal of minimizing a cost function J (x) and complying with any set of demands for a control system. The ability of optimization problem constructor 910 to formulate the EMPC problem automatically provides significant advantages over any time-consuming manual alternative.

Bidirectional Connections and Ports

Referring now to FIGS. 12A-12D, another plant diagram 1200 is shown, according to an exemplary embodiment. Plant diagram 1200 illustrates a portion of a simplified chiller plant including a chiller 1210, a load 1216 (e.g., a building, a cooling coil in an AHU or RTU, a heat exchanger, etc.), storage 1206 (e.g., a fluid storage tank, thermal energy storage, etc.), pumps 1202 and 1214, and several valves 1204, 1208, 1212, and 1218. In various embodiments, the chiller plant can be a portion of central plant 200 shown in FIG. 2 (e.g., chiller subplant 206), a portion of HVAC system 100 as shown in FIG. 1, part of the central plants shown in FIGS. 5A-5B, part of the systems shown in FIGS. 10A-10D, or any other arrangement of components.

Although the example plant diagram 1200 shown in FIGS. 12A-12D represents a chiller plant, it is contemplated that the systems and methods described herein are applicable to any type of system in which fluid flows between various devices or equipment along predetermined paths (e.g., fluid connections, conduits, pipes, ducts, conveyors, etc.). For example, the systems and methods of the present disclosure are also applicable to heating plants in which a heater or boiler heats a fluid which provides heating to a load, airside systems in which air flows within ducts in a building, a variable refrigerant flow system in which heated or chilled refrigerant flows through pipes in a building, or any other system of equipment that operate to produce, consume, or store one or more resources (e.g., hot water, cold water, heated air, cooled air, steam, electricity, natural gas, etc.), which are not necessarily limited to fluid resources. For example, the resources could include products or articles created by one machine and provided as an input to another machine in a factory setting. Similarly, the ports described herein are not necessarily fluid ports, but could include any type of inlet or outlet through which a given device of equipment receives a resource or outputs a resource. Additionally, the number or types of devices included in the system may vary depending on the type and complexity of the system.

In operation, chiller 1210 cools a fluid (e.g., water, glycol, etc.) which is motivated by pumps 1202 and 1214 to flow along the fluid connections (e.g., pipes, conduits, paths, etc.) between the components of the chiller plant. The chilled fluid produced by chiller 1210 can be stored in storage 1206 and/or used to provide cooling to load 1216, depending on which of valves 1204, 1208, 1212, and 1218 are open and closed. Load 1216 adds heat to the chilled fluid, thereby providing cooling to load 1216 and heating the fluid. The heated fluid output from load 1216 then flows back to chiller 1210 for additional cooling and/or can be stored in storage 1206, again depending on which of valves 1204, 1208, 1212, and 1218 are open and closed. For example, FIG. 12C shows the operation of the chiller plant when valves 1212 and 1218 are closed, in which the fluid circulates along a first cycle 1220 including chiller 1210, pump 1202, valve 1204, storage 1206, and valve 1208. FIG. 12D shows the operation of the chiller plant when valves 1204 and 1208 are closed, in which the fluid circulates along a second cycle 1222 including storage 1206, valve 1212, pump 1214, load 1216, and valve 1218. The fluid connections with arrows in FIGS. 12C-12D indicate fluid flow in the directions of the arrows, whereas the fluid connections shown as dashed lines in FIGS. 12C-12D indicate no fluid flow.

Figure 12A:
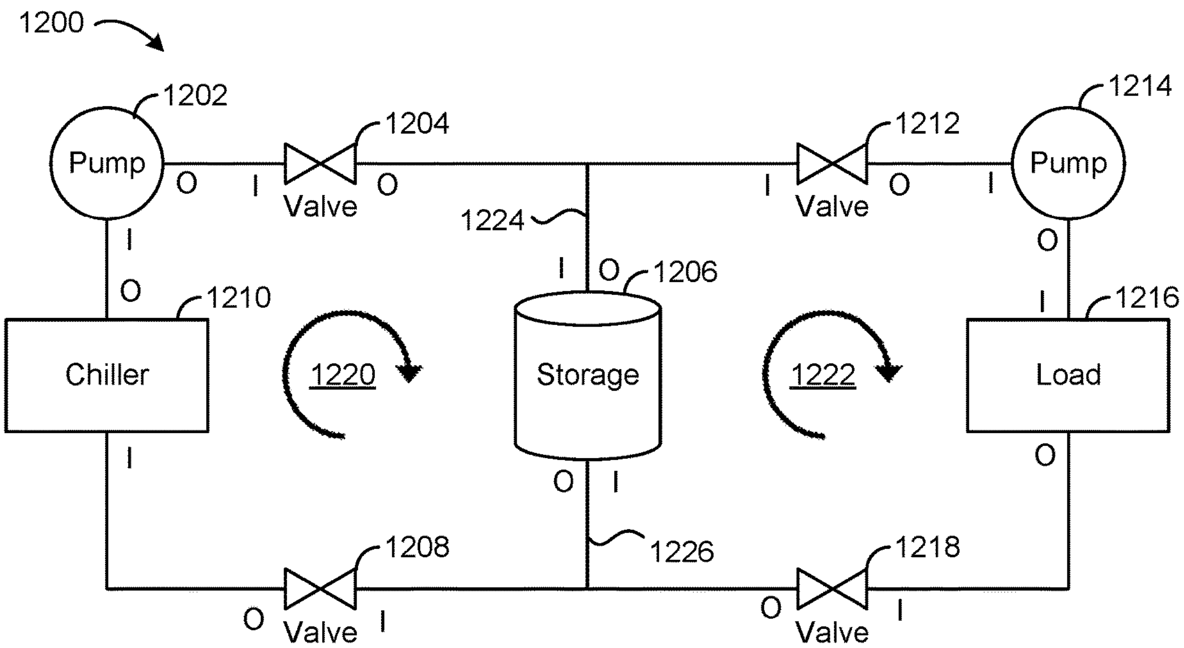
FIG. 12A is a plant diagram of a simplified chiller plant with each port of the equipment modeled as an inlet port, an outlet port, or a bidirectional port, according to an exemplary embodiment.

As shown in FIG. 12A, each of the devices shown in plant diagram 1200 can be modeled as having a fluid input represented by the "I" symbols in FIG. 12A and a fluid output represented by the "O" symbols in FIG. 12A. For example, chiller 1210 is shown as having a fluid input coupled to the fluid connection between chiller 1210 and valve 1208. Chiller 1210 is also shown having a fluid output coupled to the fluid connection between chiller 1210 and valve 1204. In some embodiments, each of the devices shown in plant diagram 1200 is modeled as having at least one fluid input and at least one fluid output. In some embodiments, one or more of the devices shown in plant diagram 1200 is modeled as having multiple fluid inputs, multiple fluid outputs, and/or a bidirectional fluid port that can serve as either a fluid input or a fluid output. For example, storage 1206 is shown having a first fluid port coupled to fluid connection 1224 and a second fluid port coupled to fluid connection 1226.

Each of the fluid ports of storage 1206 can serve as either a fluid input or a fluid output depending on whether cycle 1220 or cycle 1222 is currently active. For example, when cycle 1220 is active as shown in FIG. 12C, the first fluid port of storage 1206 coupled to fluid connection 1224 may function as a fluid input which receives fluid from fluid connection 1224, whereas the second fluid port of storage 1206 coupled to fluid connection 1226 may function as a fluid output which outputs fluid to fluid connection 1226. Conversely, when cycle 1222 is active as shown in FIG. 12D, the first fluid port of storage 1206 coupled to fluid connection 1224 may function as a fluid output which provides fluid to fluid connection 1224, whereas the second fluid port of storage 1206 coupled to fluid connection 1226 may function as a fluid input which receives fluid from fluid connection 1226.

Figure 12B:
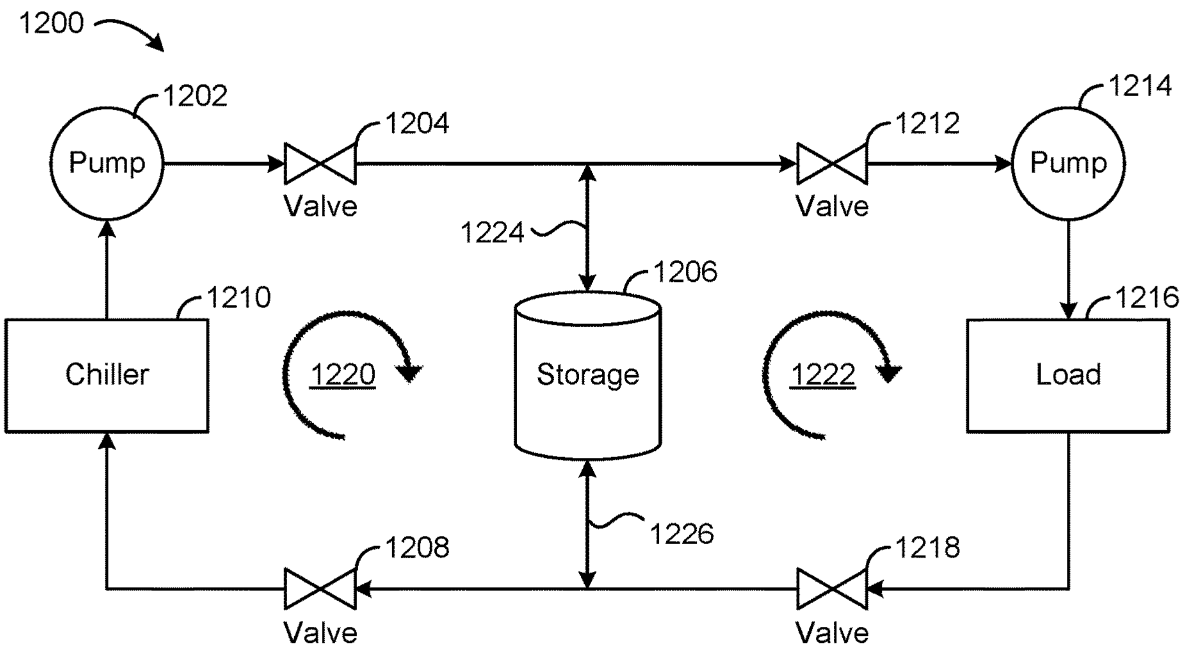
FIG. 12B illustrates the plant diagram of FIG. 12A with each connection between the equipment modeled as a unidirectional connection or a bidirectional connection, according to an exemplary embodiment.
Figure 12C:
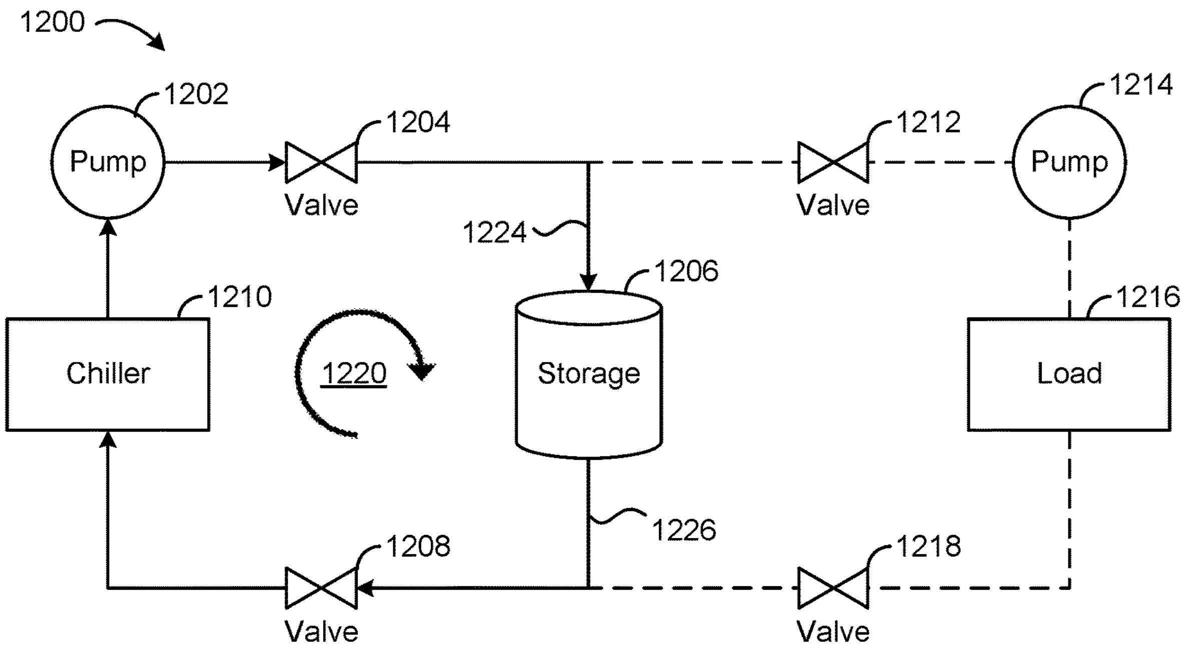
FIG. 12C illustrates the plant diagram of FIG. 12A when a first cycle is active to circulate fluid between a chiller and storage, according to an exemplary embodiment.
Figure 12D:
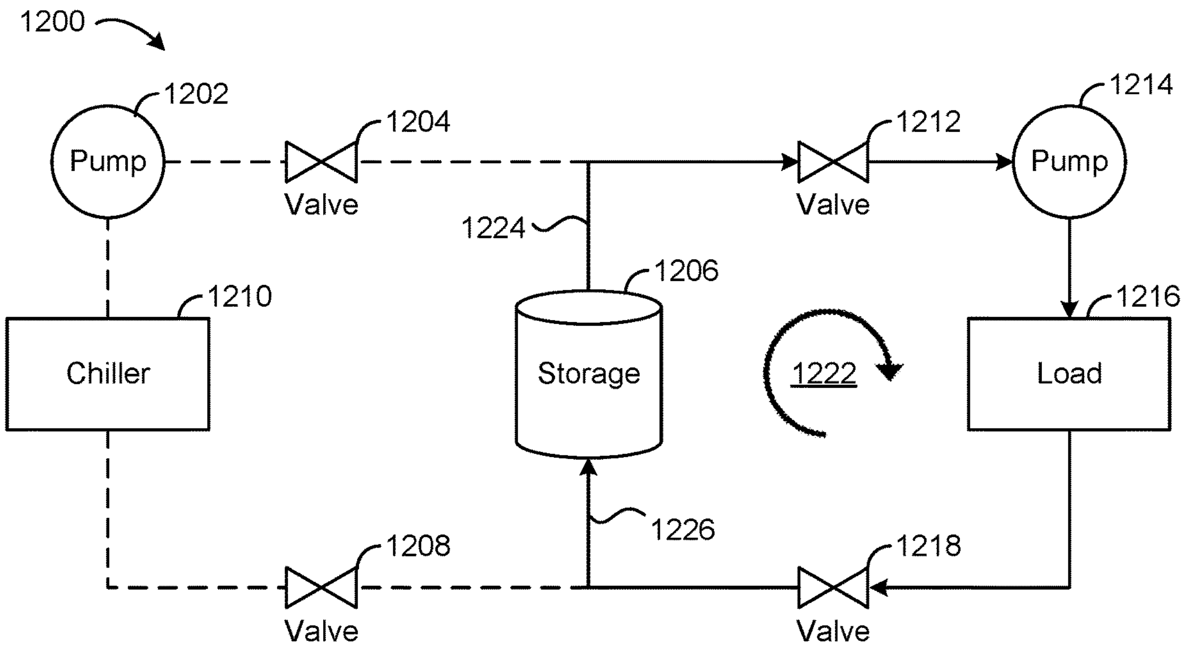
FIG. 12D illustrates the plant diagram of FIG. 12A when a second cycle is active to circulate fluid between the storage and a load, according to an exemplary embodiment.

As shown in FIG. 12B, each of the devices shown in plant diagram 1200 can be modeled as having a directed connection to one or more other devices in plant diagram 1200, represented by arrows in FIG. 12B. For example, chiller 1210 is shown having a directed connection with pump 1202 indicating that chiller 1210 outputs fluid to pump 1202 in the direction of the arrow (i.e., from chiller 1210 to pump 1202). Similarly, chiller 1210 is shown having a directed connection with valve 1208 indicating that chiller 1210 receives fluid from valve 1208 in the direction of the arrow (i.e., from valve 1208 to chiller 1210). In some embodiments, each of the devices shown in plant diagram 1200 is modeled as having at least one directed connection with at least one other device. In some embodiments, each of the devices shown in plant diagram 1200 is modeled as having at least two directed connections with at least two other devices. In general, each of the devices shown in plant diagram 1200 can have any number of directed connections with any number of other devices depending on the complexity of the system. The directed connections can include unidirectional connections and/or bidirectional connections between the devices.

In some embodiments, one or more of the devices shown in plant diagram 1200 is modeled as having one or more bidirectional connections with other devices, indicated by the fluid connections with arrows on both ends in FIG. 12B. For example, storage 1206 is shown having a first fluid connection 1224 and a second fluid connection 1226, both of which can be modeled as bidirectional connections. The direction of fluid flow along fluid connections 1224 and 1226 depends on which of cycles 1220 and 1222 are currently active. For example, when cycle 1220 is active as shown in FIG. 12C, fluid connection 1224 may deliver fluid into storage 1206, whereas fluid connection 1226 may receive fluid output by storage 1206 in the directions indicated by the arrows along fluid connections 1224 and 1226 in FIG. 12C. Conversely, when cycle 1222 is active as shown in FIG. 12D, fluid connection 1224 may receive fluid output by storage 1206, whereas fluid connection 1226 may deliver fluid into storage 1206 in the directions indicated by the arrows along fluid connections 1224 and 1226 in FIG. 12D.

In some embodiments, a bidirectional connection is a conduit or other type of connection that connects a first device of equipment to a second device of equipment. However, it should be understood that a bidirectional connection is not limited to direct connections between equipment. Another type of bidirectional connection contemplated by the present disclosure may connect two sections of a system or fluid loop to each other (e.g., connect two sections of conduit), such that one or both ends of the bidirectional connection are not directly connected to devices of equipment. For example, consider a scenario in which storage 1206 is removed from plant diagram 1200 and fluid connections 1224 and 1226 connect directly to each other in the middle of plant diagram 1200 instead of connecting to storage 1206. In this scenario, fluid connections 1224 and 1226 would together form a bidirectional connection (e.g., a pipe, conduit, etc.) that can be used in both cycle 1220 and cycle 1222 as described above. The fluid would flow in opposite directions in such a bidirectional connection depending on which of cycles 1220 and 1222 is active. As another example, another bidirectional connection could be added to plant diagram 1200 as a bypass line arranged in parallel with storage 1206 (or in parallel with the series combination of fluid connection 1224, storage 1206, and fluid connection 1226) to allow the fluid in cycles 1220 and 1222 to bypass storage 1206.

In some embodiments, the system shown in plant diagram 1200 can be modeled by a set of modeling data indicating the fluid ports of each device as well as the fluid connections between the fluid ports. For example, the modeling data for chiller 1210 may indicate that chiller 1210 has a first port fluidly coupled to pump 1202 by a first fluid connection and a second port fluidly coupled to valve 1208 by a second fluid connection. Each of the fluid ports can be defined in the modeling data as either a unidirectional fluid port such as a fluid inlet ("I") or a fluid outlet ("O"), or a bidirectional port which can function as both a fluid inlet and a fluid outlet, as shown in FIG. 12A. In some embodiments, the modeling data indicates the fluid connections between each of the devices as well as the direction of each fluid connection, as shown in FIG. 12B. For example, the modeling data may indicate that chiller 1210 has a first fluid connection with pump 1202 and may specify the direction of the connection is from chiller 1210 to pump 1202. Similarly, the modeling data may indicate that chiller 1210 has a second fluid connection with valve 1208 and may specify the direction of the connection is from valve 1208 to chiller 1210. The modeling data can have any of a variety of formats (e.g., a net list, a table of equipment and their connections, a set of connection pairs, etc.) as previously described.

In some embodiments, optimization problem constructor obtains 910 obtains modeling data (i.e., modeling input) representing a given system of equipment (e.g., plant, subplant, etc.) as and analyzes the modeling input to identify cycles in the system. As discussed above, each system can be treated as a graph containing multiple vertices and connections between the vertices. The vertices may represent the equipment present in the system and/or the fluid ports on the equipment, whereas the connections may represent the fluid conduits connecting the equipment and/or the fluid ports. A cycle can be defined as any path of vertices and connections from which a vertex can be reached from itself. Stated differently, a cycle may include a path of connections among the equipment that forms a closed loop.

Optimization problem constructor 910 can be configured to analyze the modeling input representing the system and generate a set of cycles which can be formed in the system, subject to constraints defined by the modeling input. The constraints may require some of the fluid ports to be only fluid inlets or only fluid outlets, but may permit other fluid ports to be treated as either fluid inlets or fluid outlets. Similarly, the constraints may require some of the connections between equipment/ports to be unidirectional connections (i.e., fluid is permitted to flow along the connection in only a single direction), but may permit other connections to be treated as bidirectional connections (i.e., fluid is permitted to flow along the connection in either direction). The constraints may require optimization problem constructor 910 to exclude (e.g., discard, remove, not consider, etc.) any cycles that violate the constraints, such as any cycles that would require fluid to flow against the direction of a unidirectional connection, out of an inlet-only port, or into an outlet-only port. However, optimization problem constructor 910 may retain any cycles that satisfy the constraints, such as any cycles that require fluid to flow along the indicated direction of a unidirectional connection, in any direction along a bidirectional connection, into a fluid inlet, out of a fluid outlet, or either into or out of a bidirectional fluid port.

As an example, optimization problem constructor 910 can be configured to analyze the modeling input representing plant diagram 1200 and determine that three cycles can be formed. The first cycle may correspond to cycle 1220 shown in FIG. 12C in which the fluid circulates in a closed loop between chiller 1210, pump 1202, valve 1204, storage 1206, and valve 1208, before returning back to chiller 1210 to close the loop. The second cycle may correspond to cycle 1222 shown in FIG. 12D in which the fluid circulates in a closed loop between storage 1206, valve 1212, pump 1214, load 1216, and valve 1218, before returning back to storage 1206 to close the loop. The third cycle permitted by the modeling data may include all of the devices along the perimeter of plant diagram 1200 in which the fluid circulates in a closed loop between chiller 1210, pump 1202, valve 1204, valve 1212, pump 1214, load 1216, valve 1218, and valve 1208, before returning back to chiller 1210 to close the loop.

After identifying the cycles that can be formed in a given system, optimization problem constructor 910 can modify the cycles by removing sources and sinks as described with reference to FIG. 10B, determine whether two or more the devices are arranged in parallel (e.g., in response to determining that two cycles are identical except for the parallel devices) as described with reference to FIG. 10C, generate groupings of parallel devices to simplify the system, and/or perform the other actions previously described to prepare the modeling data and identified cycles for use in automatically constructing an optimization problem or other control logic used for other types of control systems (e.g., non-optimization control systems). As one example, if the cycles and modeling data indicate that chiller 1210 has a single fluid outlet which is connected to pump 1202 and that pump 1202 receives fluid from only chiller 1210, optimization problem constructor 910 may automatically generate a constraint on the optimization problem or other condition in the control logic that requires the amount of fluid output by chiller 1210 to equal the amount of fluid received as an input at pump 1202. In various embodiments, optimization problem constructor 910 can perform any of the functions or processes described in U.S. patent application Ser. No. 16/688,864 filed Nov. 19, 2019, and/or U.S. patent application Ser. No. 17/689,569 filed Mar. 8, 2022, both of which are incorporated by reference herein in their entireties, to construct an optimization problem or other type of control framework for the system using the modeling input and identified cycles.

Automatic Control Problem Formulation Method

Referring now to FIG. 13, a flowchart of a process 1300 for automatically constructing and executing a control process for building equipment is shown, according to an exemplary embodiment. Process 1300 can be performed by any of the systems, devices, or components thereof described herein and may encompass all of the functionality of such systems or devices described with reference to FIGS. 1-12D. In some embodiments, one or more steps of process 1300 can be omitted or additional steps can be added without departing from the teachings of the present disclosure.

Process 1300 is shown to include obtaining modeling input describing a physical layout of equipment and indicating a bidirectional connection or bidirectional port (step 1302). The modeling input may identify a set of interconnected equipment such as the devices shown in plant diagram 1200 in FIGS. 12A-12D or any other set of equipment. The modeling input may include connections between the equipment (e.g., fluid connections, pipes, conduits, conveyors, etc.) indicating paths along which one or more resources are transported between the equipment. In some embodiments, the modeling input includes at least one directed connection between the equipment, where the directed connection specifies a direction that one or more resources can move along the connection. The directed connection can be defined in the modeling input as either a unidirectional connection or a bidirectional connection. In some embodiments, the modeling input indicates whether each port on the devices of the equipment is a unidirectional port (e.g., an inlet-only port or an outlet-only port) or a bidirectional port capable of functioning as an input port or an output port. The modeling input may indicate the connections between ports of different devices. The modeling input can have any of a variety of formats (e.g., a net list, a table of equipment and their connections, a set of connection pairs, etc.) as previously described.

In some embodiments, the modeling input indicates a bidirectional connection between a first device of the equipment and a second device of the equipment. The bidirectional connection may permit movement of one or more resources in both a first direction along the bidirectional connection from the first device to the second device and a second direction along the bidirectional connection from the second device to the first device. In some embodiments, the modeling input indicates a bidirectional connection between a first device of the equipment and a second device of the equipment and a unidirectional connection between the second device of the equipment and a third device of the equipment.

In some embodiments, the modeling input indicates a bidirectional port on a first device of the equipment. The bidirectional port may permit providing one or more resources as an input to the first device of the equipment via the bidirectional port and as an output of the first device of the equipment via the bidirectional port. In some embodiments, the modeling input indicates a bidirectional port on a first device of the equipment and a unidirectional port on a second device of the equipment.

Process 1300 is shown to include determining cycles formed by the equipment based on the modeling input (step 1304). Determining the cycles in step 1304 may include modeling the system of equipment as a graph containing multiple vertices and connections between the vertices. The vertices may represent the equipment present in the system and/or the ports on the equipment, whereas the connections may represent the conduits or paths connecting the equipment and/or the ports. A cycle can be defined as any path of vertices and connections from which a vertex can be reached from itself. Stated differently, a cycle may include a path of connections among the equipment that forms a closed loop.

Determining the cycles in step 1304 may include analyzing the modeling input describing the system of interconnected equipment and generating a set of cycles which can be formed in the system, subject to constraints defined by the modeling input. The constraints may require some of the ports to be only inlets or only outlets, but may permit other ports to be treated as either inlets or outlets. Similarly, the constraints may require some of the connections between the equipment/ports to be unidirectional connections (i.e., a resource is permitted to flow along the connection in only a single direction), but may permit other connections to be treated as bidirectional connections (i.e., a resources permitted to flow along the connection in either direction).

The constraints may require one or more of the cycles initially generated or considered in step 1304 to be excluded (e.g., discarded, removed, not considered, etc.) from the final set of cycles if such cycles would violate the constraints. For example, any cycles that would require a resource to move against the direction of a unidirectional connection, out of an inlet-only port, or into an outlet-only port may be classified as a non-compliant cycle in step 1304. Step 1304 may include discarding non-compliant cycles and retaining any compliant cycles which satisfy the constraints. Compliant cycles may include any cycles that require a resource to move along the indicated direction of a unidirectional connection, in any direction along a bidirectional connection, into a fluid inlet, out of a fluid outlet, or either into or out of a bidirectional fluid port, and do not include any non-compliant features that characterize non-compliant cycles.

In some embodiments, step 1304 includes generating a constraint that requires a resource to move along the path of directed connections in a direction specified by the directed connections. Step 1304 may include excluding a non-compliant cycle from the set of cycles in response to determining that the non-compliant cycle requires the resources to move along the path of directed connections in a direction that violates the constraint. In some embodiments, step 1304 includes generating a constraint that requires the a resource to move into a first device of the equipment or out of the first device of the equipment in a direction specified by a unidirectional port of the first device. Step 1304 may include excluding a non-compliant cycle from the one or more cycles in response to determining that the non-compliant cycle requires the resources to move into the first device of the equipment or out of the first device of the equipment in a direction that violates the constraint.

In some embodiments, the cycles generated in step 1304 include a first cycle in which a resource move in a first direction along the bidirectional connection and a second cycle in which the resource moves in a second direction along the bidirectional connection opposite the first direction. In some embodiments, the cycles generated in step 1304 include a first cycle in which the bidirectional port functions as an input port through which a resource is provided as an input to a first device of the equipment and a second cycle in which the bidirectional port functions as an output port through which the resource is provided as an output from the first device of the equipment.

Process 1300 is shown to include formulating a control problem using the cycles formed by the equipment (step 1306). In some embodiments, formulating the control problem in step 1306 includes modifying the cycles by removing sources and sinks as described with reference to FIG. 10B, determining whether two or more the devices are arranged in parallel (e.g., in response to determining that two cycles are identical except for the parallel devices) as described with reference to FIG. 10C, generating groupings of parallel devices to simplify the system, and/or performing the other actions previously described to prepare the modeling inputs and/or identified cycles for use in automatically constructing the control problem. The control problem may include an optimization problem (e.g., an objective function and a set of constraints) or a non-optimization control problem in various embodiments.

Formulating the control problem in step 1306 may include identifying the particular resources produced or consumed by each device of the equipment and assigning costs or penalties to the values of certain inputs or outputs of the equipment. For example, if the modeling input indicates that a given device of the equipment receives an input resource such as natural gas or water from a utility provider along an input connection, formulating the control problem in step 1306 may include adding the amount of that resource received along the input connection to an objective function that quantifies an amount of the resource consumed or purchased from the utility provider. Formulating the control problem may include adding various terms to the objective function to capture the total amount or cost of each resource consumed by the system of equipment in excess of the resources produced internally by the system of equipment (i.e., the amount of resources which must be obtained from external sources).

Formulating the control problem in step 1306 may include generating a set of constraints based on the connections between the equipment and/or the cycles formed by the equipment. For example, consider a scenario in which the cycles and connections between the equipment indicate that a first device of the equipment has a single outlet which is connected to a second device of the equipment and the second device receives a resource from only the first device. In this scenario, step 1306 may include automatically generating a constraint that requires the amount of the resource output by the first device to equal the amount of that resource received as an input at the second device. Similar constraints can be automatically generated based on each of the connections indicated by the modeling input. In some embodiments, step 1306 may include performing any of the functions or processes described in U.S. patent application Ser. No. 16/688,864 filed Nov. 19, 2019, and/or U.S. patent application Ser. No. 17/689,569 filed Mar. 8, 2022, to automatically formulate an optimization-based or non-optimization-based control problem.

Process 1300 is shown to include operating the equipment according to the control problem (step 1308). Step 1308 may include solving the control problem using any of a variety of control algorithms or methodologies (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate a set of control decisions for the equipment. In some embodiments, step 1308 includes solving an optimization problem subject to a set of constraints. In other embodiments, step 1308 may include solving a non-optimization control problem subject to a set of constraints.

The control decisions may include amounts of each resource to be produced or consumed by each device of the equipment, a flow rate of each resource along each of the connections between equipment, an amount of each resource to be obtained from utility providers or other outside sources, an amount of each resource to be delivered to sinks such as building loads, amounts of each resource to be stored internally within the system (e.g., in storage tanks, in batteries, etc.), on/off states for devices of the equipment, operating modes for the devices of the equipment, or any other control decision which affects the operation of the equipment. Step 1308 may include generating and providing control signals to the equipment to cause the equipment to produce, consume, store, or discharge amounts of each resource in accordance with the set of control decisions.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for equipment that operate to produce, consume, or store one or more resources, the control system comprising one or more processing circuits configured to:

obtain modeling input describing a physical layout of the equipment, the modeling input indicating a bidirectional connection between the equipment;

determine one or more cycles formed by the equipment based on the modeling input, a cycle comprising a path of directed connections between the equipment that forms a closed loop;

formulate a control problem using the one or more cycles formed by the equipment; and operate the equipment according to the control problem.

2. The control system of claim 1, wherein:

the modeling input indicates the bidirectional connection between a first device of the equipment and a second device of the equipment; and the bidirectional connection permits movement of the one or more resources in both a first direction along the bidirectional connection from the first device to the second device and a second direction along the bidirectional connection from the second device to the first device.

3. The control system of claim 1, wherein the one or more cycles comprise:

a first cycle in which the one or more resources move in a first direction along the bidirectional connection; and a second cycle in which the one or more resources move in a second direction along the bidirectional connection opposite the first direction.

4. The control system of claim 1, wherein:

formulating the control problem comprises generating a constraint based on the one or more cycles; and operating the equipment according to the control problem comprises using the constraint to generate a set of control decisions for the equipment in accordance with the constraint.

5. The control system of claim 1, wherein the path of directed connections comprises:

the bidirectional connection between a first device of the equipment and a second device of the equipment; and a unidirectional connection between the second device of the equipment and a third device of the equipment.

6. The control system of claim 1, wherein determining the one or more cycles formed by the equipment comprises:

generating a constraint that requires the one or more resources to move along the path of directed connections in a direction specified by the directed connections; and excluding a non-compliant cycle from the one or more cycles in response to determining that the non-compliant cycle requires the one or more resources to move along the path of directed connections in a direction that violates the constraint.

7. The control system of claim 1, wherein:

the modeling input indicates a port of the equipment is a bidirectional port capable of both receiving the one or more resources as an input and providing the one or more resources as an output; and determining the one or more cycles comprises determining a first cycle in which the bidirectional port is an input port and a second cycle in which the bidirectional port is an output port.

8. A control system for equipment that operate to produce, consume, or store one or more resources, the control system comprising one or more processing circuits configured to:

obtain modeling input describing a physical layout of the equipment, the modeling input indicating a bidirectional port of the equipment;

determine one or more cycles formed by the equipment based on the modeling input, a cycle comprising a path of directed connections between the equipment that forms a closed loop;

formulate a control problem using the one or more cycles formed by the equipment; and operate the equipment according to the control problem.

9. The control system of claim 8, wherein:

the modeling input indicates the bidirectional port on a first device of the equipment; and the bidirectional port permits providing the one or more resources as an input to the first device of the equipment via the bidirectional port and as an output of the first device of the equipment via the bidirectional port.

10. The control system of claim 8, wherein the one or more cycles comprise:

a first cycle in which the bidirectional port functions as an input port through which the one or more resources are provided as an input to a first device of the equipment; and a second cycle in which the bidirectional port functions as an output port through which the one or more resources are provided as an output from the first device of the equipment.

11. The control system of claim 8, wherein:

formulating the control problem comprises generating a constraint based on the one or more cycles; and operating the equipment according to the control problem comprises using the constraint to generate a set of control decisions for the equipment in accordance with the constraint.

12. The control system of claim 8, wherein the path of directed connections comprises:

the bidirectional port on a first device of the equipment; and a unidirectional port on a second device of the equipment.

13. The control system of claim 8, wherein determining the one or more cycles formed by the equipment comprises:

generating a constraint that requires the one or more resources to move into a first device of the equipment or out of the first device of the equipment in a direction specified by a unidirectional port of the first device; and excluding a non-compliant cycle from the one or more cycles in response to determining that the non-compliant cycle requires the one or more resources to move into the first device of the equipment or out of the first device of the equipment in a direction that violates the constraint.

14. The control system of claim 8, wherein:

the modeling input indicates a bidirectional connection between a first device of the equipment and a second device of the equipment; and determining the one or more cycles comprises determining a first cycle in which the one or more resources move in a first direction along the bidirectional connection and a second cycle in which the one or more resources move in a second direction along the bidirectional connection opposite the first direction.

15. A method for operating equipment to consume, produce, or store one or more resources, the method comprising:

obtaining modeling input describing a physical layout of the equipment, the modeling input indicating a bidirectional connection between the equipment or a bidirectional port of the equipment;

determining one or more cycles formed by the equipment based on the modeling input, a cycle comprising a path of directed connections between the equipment that forms a closed loop;

formulating a control problem using the one or more cycles formed by the equipment; and operating the equipment according to the control problem.

16. The method of claim 15, wherein:

the modeling input indicates the bidirectional connection between a first device of the equipment and a second device of the equipment; and the bidirectional connection permits movement of the one or more resources in both a first direction along the bidirectional connection from the first device to the second device and a second direction along the bidirectional connection from the second device to the first device.

17. The method of claim 15, wherein:

the modeling input indicates the bidirectional port on a first device of the equipment; and the bidirectional port permits providing the one or more resources as an input to the first device of the equipment via the bidirectional port and as an output of the first device of the equipment via the bidirectional port.

18. The method of claim 15, wherein the one or more cycles comprise:

a first cycle in which the one or more resources move in a first direction along the bidirectional connection or through the bidirectional port; and a second cycle in which the one or more resources move in a second direction along the bidirectional connection or through the bidirectional port opposite the first direction.

19. The method of claim 15, wherein determining the one or more cycles formed by the equipment comprises:

generating a constraint that requires the one or more resources to move along the path of directed connections in a direction specified by a unidirectional connection or unidirectional port along the path of directed connections; and excluding a non-compliant cycle from the one or more cycles in response to determining that the non-compliant cycle requires the one or more resources to move along the path of directed connections in a direction that violates the constraint.

20. The method of claim 15, wherein:

formulating the control problem comprises generating a constraint based on the one or more cycles; and operating the equipment according to the control problem comprises using the constraint to generate a set of control decisions for the equipment in accordance with the constraint.

* * * * *